(12) United States Patent  (10) Patent No.: US 6,466,389 B1
Ochi et al.  (45) Date of Patent: Oct. 15, 2002

(54) LIBRARY APPARATUS

(75) Inventors: Yoshiaki Ochi, Kawasaki; Yasuhiko Hanaoka, Inagi, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/131,556

(22) Filed: Aug. 10, 1998

(30) Foreign Application Priority Data

Dec. 25, 1997 (JP) ............................................ 9-357493

(51) Int. Cl.[7] .................................................. G11B 15/18
(52) U.S. Cl. ........................................................ 360/69
(58) Field of Search ............................. 360/69, 71, 92; 369/36, 69, 34; 253/383, 462; 414/932

(56) References Cited

U.S. PATENT DOCUMENTS

| 4,638,171 | A | * | 1/1987 | Gassmann | 250/566 |
|---|---|---|---|---|---|
| 5,231,277 | A | * | 7/1993 | Aritake et al. | 235/462 |
| 5,280,385 | A | * | 1/1994 | Wybrow | 359/438 |
| 5,303,214 | A | * | 4/1994 | Kulakowski et al. | 369/34 |
| 5,323,327 | A | * | 6/1994 | Carmichael et al. | 360/92 X |
| 5,661,287 | A | * | 8/1997 | Schaefer et al. | 360/92 X |
| 5,703,843 | A | * | 12/1997 | Katsuyama et al. | 369/36 X |
| 5,886,336 | A | * | 3/1999 | Tang et al. | 235/462 |

FOREIGN PATENT DOCUMENTS

JP          7098920          4/1995

* cited by examiner

Primary Examiner—David Hudspeth
Assistant Examiner—K. Wong
(74) Attorney, Agent, or Firm—Greer, Burns & Crain, Ltd.

(57) ABSTRACT

A library device is provided which can handle cartridges with back bar code labels only, side bar code labels only, and both back and side bar code labels. A bar code reader reads back bar code labels of cartridges, and a mirror is attached to a wall of each cell in the cell drum to guide a laser beam from the bar code reader to a label on one side surface of a cartridge, for side bar code reading by the bar code reader.

15 Claims, 33 Drawing Sheets

▨ CARTRIDGE PRESENT

LIBRARY APPARATUS

This invention relates to a library device, and more particularly, to a magnetic tape cartridge recognition device in a magnetic tape library apparatus which is connected to a large computing system as a large-capacity storage device.

BACKGROUND OF THE INVENTION

To process growing volumes of information in computing systems, many fully-automatic library devices that do not require operators are appearing these days, as a means of storing large volumes of information. These library devices use single-reel tape cartridges as storage media, and handle cartridges fully automatically.

To automate cartridge transportation, a fully-automatic library has a media handling robot called an accessor as a cartridge transporting device which can be moved in the library device. While moving on a lengthwise rail in the library device, this accessor inserts or ejects a cartridge and mounts a cartridge on or demounts one from a data recording and regenerating device automatically.

To insert a cartridge into or eject one from this automated library device, the address of each cartridge frame (hereinafter, called cell) should be related to the cartridge to be stored. For cartridge identification, bar codes on the cartridges are read and the read data is managed.

FIG. 1 shows an example of a conventional library device 2. The library device 2 has an accessor unit 9, a drum unit 10, and a drive unit 12 which can be installed in a flexible layout.

FIG. 2 is a cutaway view showing the internal structure of the library device 2. The library device 2 has two cartridge access stations 4 (CAS), one on the front side of the left accessor unit 7 and the other on the front side of the right accessor unit 9.

Each cartridge access station 5 has a cartridge entry 6 and a cartridge exit 8. The cartridge entry 6 and exit 8 can rotate 180 degrees around their vertical axes.

Drum units 10a, 10b have cell drums 15a, 15b each containing several cells. The cells drums 15a, 15b each consist of cell segments 17a–17f. The cell segments 17a–17f have n-stage cells in three rows.

Each cell accommodates a cartridge that stores magnetic tape. The cartridge can be an I3480-type magnetic tape cartridge or any other suitable device. By opening the direct entry exit (DEE) door 64 of the drum unit 10a, the operator can insert a cartridge into, or eject one from one of the cell segments 17a to 17f located in front of the DEE door 64.

Four drive units 12a–12d record and regenerate information on magnetic tape stored in each cartridge. Each drive unit 12a to 12d of the library device 2 has several tape drive units (for example, four tape drive units in each drive unit). These tape drive units have cartridge entry-exit ports. A cartridge entry-exit port is a plane including the X axis, tilted by 5.5 degrees from the vertical plane relative to the Y axis.

The housing 4 accommodates PC boards for controlling the cartridge access station 5, drum units 10a, 10b, drive units 12a–12d, and two accessor units 14.

The accessor 14 has a hand assembly 16 which can be moved vertically (direction Y in the figure) along the vertical column 18 projecting from the rail base 32. The rail base 32 enables the accessor 14 to move horizontally (direction X in the figure) along the guide rail (X rail) 20. The accessor 14 is an X-Y move mechanism. A sensor 163 is attached to the rail base 32 of the accessor 14 to detect the position flag 165 on the accessor unit 9.

FIG. 3 is a cutaway view showing the internal structure of a drum unit 10a in the library device 2. The drum unit 10a contains a drum 3 which is driven by a motor (not illustrated in the figure). The drum 3 contains seven rows of cell segments (17a to 17f in FIG. 2). The cell segments 17 of each row accommodate several DEE magazines 30 each having cells 5 in three rows and seven stages. The DEE magazine 30 can accommodate up to 21 cartridges 1. The operator can insert a DEE magazine 30 in each cell by opening the DEE door 64 of the drum unit 10a from the DEE operation panel 31.

The drum unit 10a contains a DEE controller 33, a power sequencer 34, a power supply 35 for DEE and LBR, a drum power supply 36, an AMC interface 37, a driver unit 38, a drum controller 39, a local bar code reader (LBR) assembly 40, a controller 41 for local bar code reader, a vertical column base 78, and a bar code reader 68 for reading the back bar code label 1B of a cartridge 1. The drum unit 10a also has an operator panel 43 on the front.

The local bar code reader assembly 40 is placed at the corner adjacent to the downstream DEE door in the rotating direction of the housing drum 3 of the square-column-shaped drum unit 10a. Since the drum unit 10a uses a polyhedral rotating cell drum 15a, a local bar code reader 68 can be mounted on a corner of the housing.

The accessor 14 accesses a cell 50 on the cell drum 15a through a port on the back of the drum unit 10a. Before the cell segment 17 where the operator inserted or ejected a cartridge reaches the back of the drum unit 10a, the local bar code reader 68 can read a bar code label on the cartridge 1.

FIGS. 4(a) and 4(b) show only the local bar code reader 40 in FIG. 3. The bar code reader 68 on the local bar code reader 40 is linked to the slide guide 76 and moves together with the guide. This slide guide 76 moves back and forth along the slide rail 74. The slide rail 74 is attached to the vertical column base 78. The vertical column base 78 supports the bar code reader 68, lower pulley 72, upper pulley 106, pulse motor 70, and slide rail 74. There is a timing belt 108 between the lower pulley 72 and upper pulley 106. The timing belt 108 is secured on the slide guide 76 of the bar code reader 68.

A balancing weight 110 is attached to the timing belt 108 to counterbalance the weight of the bar code reader 68. This bar code reader 68 can rotate around the slide guide 76 in the axial direction. The motor 82 on the slide guide 76 drives the bar code reader 68.

The pulse motor 70 rotates the lower pulley 72. Rotation of the lower pulley 72 is conveyed through the timing belt 108 and moves the slide guide 76 along the slide rail 74 where the bar code reader 68 is mounted. A sensor secured on the slide guide 76 detects the flags of the position flag bar. Flags detected by the sensor are counted to determine the position of the slide guide 76 on the vertical column base 78. These sensors and the position flag bar configure the position detection mechanism of the bar code reader 68.

The flange 78a at the bottom of the vertical column base 78 is secured on the base of the drum unit 10a with screws, and the flange 78b at the top is secured on the top of the drum unit 10a. Therefore, the local bar code reader 40 can be disengaged from the drum unit 10a if the screws affixed to the flanges 78a, 78b are removed.

The controller 41 on the vertical column base 78 sends control signals to control the bar code reader 68. These control signals reach the bar code reader 68 through the signal cable 42. By connecting or disconnecting a connector (not illustrated), the bar code reader 68 and the signal cable 42 can be connected or disconnected. The controller 41 sends drive signals to the drum motor (not illustrated) of the cell drum 15 through another signal cable (not illustrated).

FIG. 5 shows the structure of the accessor 14 shown in FIG. 2. The accessor 14 consists of a rail base 32 which moves along the lengthwise guide rail (X rail) of the library device 2, a vertical column 18 projecting from the rail base 32, and a hand assembly 16 which moves along the vertical column 18. The accessor 14 transports a cartridge along the X rail 20.

The rail base 32 has a drive roller 19A and a follower roller 19B on each end to hold the X rail between them. The drive roller 19A is driven by a motor 25X on the rail base 32. When the drive roller 19A rotates, the rail base 32 moves on the X rail.

The vertical column 18 has one pulley (not illustrated) each at the mounting end and at the free end on the rail base 32. There is a timing belt between the two pulleys. This belt 21 is driven by the motor 25Y on the vertical column 18. The vertical column 22 has a guide rail to move a hand assembly 16.

The hand assembly 16 is mounted on a carriage 24 which moves vertically along the guide rail 22 formed on the vertical column 18 of the accessor 14. The carriage 24 has a motor 25Z and a PC board 29 for controlling the motor. Together with the motor 25Z and PC board 29, this carriage 24 moves along the guide rail 22 in the Y-axis direction.

The motor 25Z turns the mount base 27 of the hand assembly 16 around a vertical axis parallel with the Y axis through the timing belt 26 linked to the output axis of the motor. In other words, the motor 25Z oscillates the mount base 27 in the cartridge moving direction.

On the mount base 27 is positioned a hand unit 23 to hold the cartridge, a motor 28A for moving the hand unit 23 in the direction indicated by arrow Z, and a motor 28B for tilting the hand unit 23 against the mount base 27. The five motors 25X, 25Y, 25Z, 28A, 28B enable the hand unit 23 of the hand assembly 16 to move freely in three dimensions.

FIGS. 6 (a) to 6 (c) show the structure of a cartridge 1 used in the library device 2 as storage media. For example, the cartridge 1 can be a 12.7-mm-wide magnetic tape of a high recording density wound around a reel and accommodated in a casing 1a. The tape 1b has a leader block 1c at its front end for threading. When the cartridge 1 is ejected, this leader block 1c is in the casing 1a. The reel is secured by a lock mechanism to prevent vibrations from slackening the tape during transportation.

The cartridge 1 has a writable label L0 on the top 1T and bar code labels L1, L2 on the back 1B and one side 1S. FIG. 7 (a) shows an example of bar code label L1 to affix to the back 1B of the cartridge 1, and FIG. 7 (b) shows an example of bar code label L2 to affix to the side 1S of the cartridge 1.

FIG. 8 shows an example of hardware structure for the library device 2. In the figure, the library device 2 is connected to four host computers 301–304. The host computers 301–304 are connected to the library device 2 through their channel interface buses 311–314. The buses 311–314 may be block multiplexer channel or SCSI interfaces. For example, four directors 321–324 are installed on the library device 2. Two directors 321, 323 have channels A to D and the other two (322, 324) have channels E to H.

The channel interface bus 311 from the host computer 301 is connected to channel A of the directors 321, 323 and the channel interface bus 312 from the host computer 302 is connected to channel B. The channel interface bus 313 from the host computer 303 is connected to channel E of the directors 322, 324 and the channel interface bus 314 from the host computer 303 is connected to channel F. Channels C and D of the directors 321, 323 and channels G and H of the directors 322, 324 are not used.

Two channels a and b are prepared on the terminal side of the directors 321 –324. Channel a is for the magnetic tape units 340, 350 (MTUs) and channel b is for accessor control. The directors 321,322 share eight MTUs commonly connected through device buses 331, 332 of channel a. Therefore, the directors 321, 322 can access, for write or read operations, the MTUs 340 through channel a. The eight MTUs 340 are located in the drive units 12a–12c.

The directors 323, 324 share eight MTUs connected commonly through device buses 333, 234 of channel a. Therefore, the directors 323, 324 can make write or read access to the MTUs 350 through channel a. The eight MTUs 350 are located in the drive units 12b, 12d.

The device interface bus 338 from channel b of the directors 321, 322 is connected to channel a of the accessor controller 328. The device interface bus 339 from channel b of the directors 323, 324 is connected to channel b of the accessor controller 328.

The accessor controller 330 is a spare device where the device interface bus 338 from channel b of the directors 321, 322 is connected to channel a and the device interface bus 339 from channel b of the directors 323, 324 is connected to channel b.

The accessor controllers 328, 330 execute processing in accordance with an instruction received from one of the directors 321–324. Under the accessor controller 330 are machine controllers 351,352 for controlling the accessors 14 of the accessor units 7, 9. Under the accessor controller 328 are drum controllers 361, 362 for controlling the cell drums 15a, 15b of each of the drum units 10a. The accessor controllers 328, 330, machine controllers 351, 352, and drum controllers 361, 362 are in the accessor units 7, 9. For ease of understanding, FIG. 8 shows two cell drums 15a, 15b.

The machine controllers 351, 352 and drum controllers 361, 362 are also connected commonly to the accessor controller 330. When a library device 2 I/O request is received for job execution, a host computer 301–304 specifies a logical device address and issues to the directors 321, 322 through its own allocated channel a move command instructing the I/O device to start operation. Once a normal receive response to this move command is received from the director side, the host computer transfers data bytes (command parameters) as media transportation information.

The data bytes containing the move-from and move-to addresses of the cartridge are stored in the queuing table of the accessor controller 328. If the accessor 14 of an accessor unit 7, 9 is found to be idle, the accessor controller 328 fetches the move-from and move-to addresses of the move command from the queuing table and instructs a machine controller 351, 352 to move the accessor 14. If necessary, the accessor controller 328 also instructs a drum controller 361, 362 to rotate a cell drum 15a. 15b.

By referencing the conversion table, the accessor controller 328 converts move-from and move-to cell addresses fetched from the queuing table into a cell drum rotation angle !!XX!! and an accessor coordinate position (X, Y). The cell drum is then turned by the rotation angle !!XX!! and the accessor is moved to the position (X, Y).

FIGS. 9 (a) and 9 (b) show the structure of the cell drum 15 and the position of the local bar code reader 40. As FIG.

3 shows, the cell drum 15 has seven faces and has a capacity of 21 cartridges. The local bar code reader 40 is positioned at one side of this cell drum 15. The bar code reader shown in FIG. 4 checks each cell in the cell drum 15 for a cartridge 1 while being guided by the slide rail 74, and reads information from the back or side bar code label of the cartridge 1.

The library device 2 having the above structure identifies each cartridge 1 with a bar code as explained next. Under conventional technology, when a DEE (entry or exit) start command is received from a host computer, all of the drum cells in a library device are made available for the execution by the operator of the entry or exit procedure for cartridges in units of rows. After inserting or ejecting cartridges, the operator had to press the DEE end switch to report the end of DEE work to the host computer.

FIG. 10 shows the conventional cartridge entry procedure by the operator. In step 101, the operator confirms a DEE start instruction from the host computer. The operator then opens the DEE door in step 102, inserts cartridges in step 103, and closes the DEE door in step 104. The cell drum rotates to the next three rows. Step 105 is to verify that cartridges were inserted into all of the rows of the cell drum. If the cartridge entries are not yet completed, the procedure from step 102 to 104 is repeated. Once the completion of cartridge entries has been confirmed, the procedure advances to step 106. The operator then presses the DEE end switch and reports the end of DEE work to the host computer.

When the end of DEE work is reported, the host computer issues a bar code read command. In accordance with this command, the local bar code reader 40 reads the bar code label on the back of a specified cartridge and reports the bar code data each time a cartridge is detected. In the conventional library system, a host computer had to issue the same number of bar code read commands as there were cells contained in the row of the drum.

FIG. 11 shows the conventional procedure for a host computer to read a bar code label on each cartridge.

Step 201 is to check whether the DEE switch was pressed. If the DEE switch was not pressed, this routine terminates. If the DEE switch was pressed, the procedure advances to step 202 where the host computer issues a read instruction each time a cartridge is detected to read the bar code label on the cartridge. In step 203, the bar code reader (BR) (68) moves to the position of a specified cartridge 1 and reads the back bar code label of the cartridge using a laser beam.

Step 204 is to check whether the back bar code label of the cartridge 1 could be read. If the bar code could be read, the procedure advances to step 205. There the system checks whether the read bar code is the bar code on the no-cartridge label affixed inside each cell in the cell drum. If the bar code is not the bar code on the no-cartridge label, the procedure advances to step 206 where data from the back bar code label of the cartridge 1 is reported to the host computer and this routine terminates. If the bar code is the bar code on the no-cartridge label, the procedure advances to step 207 where the absence of a cartridge is reported to the host computer and this routine terminates.

If the bar code could not be read in step 204, the procedure advances to step 208 where the bar code reader 68 moves to the master bar code label and reads the master bar code. Step 209 is to check whether the master bar code could be read. If the master bar code could be read, the procedure advances to step 210 where the absence of a bar code label on the cartridge is reported to the host computer and this routine terminates. If the master code could not be read, the procedure advances to step 211 where a fault of the bar code reader 68 is reported to the host computer and this routine terminates.

There are some problems with the known devices just described. For example, a local bar code reader can read a bar code label on the back but not on a side surface of a cartridge in the conventional cartridge check procedure by a host computer. If the local bar code reader becomes faulty, cartridges cannot be inserted from the cell drum because only one bar code reader is assigned to each cell drum. Moreover, even if the local bar code reader fails to read a bar code label, the bar code reader at the accessor does not retry reading because the local bar code reader and the accessor are not interlocked.

There are more problems with known devices. Each time a bar code label is not detected on a cartridge, the master bar code label is checked for comparison to see whether the cartridge is not labeled or the local bar code reader is faulty. Also, the local bar code reader reads bar code labels only on cartridges when an instruction is received from the host computer after the operator completes the DEE work.

Since bar code label data is reported to the host computer each time a cartridge is read, the host computer issues the same number of label read instructions as there are cells contained in the row of the drum. This invention solves these problems and disadvantages.

OBJECTS OF THE INVENTION

Thus, this invention includes at least the following features:

(1) Providing a library device which can read the side bar code labels of cartridges;
(2) Providing a library device which allows cartridge entries from a cell drum even when one bar code reader becomes faulty;
(3) Providing a library device where the two bar code readers are interlocked with the accessor so that one bar code reader retries reading if the other bar code reader fails to read a bar code label;
(4) Providing a library device which reduces the bar code label read time after the DEE work by the operator;
(5) Providing a library device which reduces the time for reporting bar code label data to the host computer; and
(6) Providing a library device which reduces the time for checking a non-labeled cartridge.

Accordingly, one object of this invention is to provide a library device which can accurately read bar code labels on cartridges, including labels on the sides of cartridges.

A second object of this invention is to provide a library device which can insert cartridges from a cell drum even when one local bar code reader is faulty.

A third object of this invention is to provide a library device which can identify the bar code contents even if a local bar code reader fails to read a bar code label.

A fourth object of this invention is to provide a library device which can reduce the bar code read time after the operator finishes direct entry/exit (DEE) work.

A fifth object of this invention is to provide a library device which can reduce the time for reporting bar code data to the host computer.

A sixth object of this invention is to provide a library device which can reduce the time for checking a cartridge for a label.

SUMMARY OF THE INVENTION

The first form of this invention, which achieves the first purpose above, is a large-capacity storage device connected to a computing system with cartridges as storage media. A data recording and regenerating device for writing data into, and reading it from cartridges is provided, with a cartridge entry-exit device for inserting and ejecting cartridges, cells for storing cartridges, a media transporting device for transporting cartridges between the cell plates and the data recording and regenerating device, and a label reading device at the cell drum for reading labels on cartridges.

A laser guidance means is provided on the wall beside the cartridge in each cell of the cell drum to guide laser beams from the label reading device to the side label of each cartridge for reading by the device. The laser guidance means may be a mirror, a prism or the like. The label reading device may have parallel moving mechanisms behind the cartridges in the cells which can move to the wall side to read other labels.

This laser guidance means enables the label reading device to read a label on one side of a cartridge. Then data read from the back label of a cartridge can be compared with that read from the side label of the same cartridge. It is possible to output a cartridge error signal if the data does not match. In addition, it is possible to instruct a reading of data from the side label of the same cartridge if the device failed to read the back label.

The second form of this invention achieves the second purpose of the invention. It is a large-capacity storage device connected to a computing system with cartridges as storage media, equipped with a data recording and regenerating device for writing data into, and reading it from cartridges. A cartridge entry-exit device is provided for inserting and ejecting cartridges, with cells for storing cartridges, fixed frame plates, a media transporting device for transporting cartridges between the cells and the data recording and regenerating device, and a label reading device at the cell drum for reading labels on cartridges. The label reading device has a rail in the vertical direction of the cell drum, first and second bar code readers which can move on the rail, and control circuits for controlling the bar code readers. A memory can be provided which stores cartridge locations as the cartridges are placed in the storage device.

By adding various functions to the control circuits, the following operations can be realized:

(1) The library device may have a means of controlling the first and second bar code readers in parallel. The first and second bar code readers can then read cartridge labels simultaneously.

(2) The library device may have a means of detecting a positioning error and retrying positioning for the first and second bar code readers. If a positioning error occurs in the first or second bar code reader, the bar code reader is returned to the home position and positioning is retried.

(3) The library device may have a means of detecting an operation error and issuing a retraction or continuous read instruction for the first and second bar code readers. If an operation error occurs in the first or second bar code reader, the bar code reader is retracted to the retraction position and the other bar code reader continues the read processing.

(4) The library device may have a means of recording the time for the scheduled maintenance of a bar code reader and issuing a move or continuous read instruction for the first and second bar code readers. If the time for performing the scheduled maintenance for the first or second bar code reader arrives, the bar code reader moves to the maintenance position and the other bar code reader continues the read processing.

(5) The library device may have a means of detecting a read error and issuing a retraction or substitute read instruction. If a read error occurs in the first or second bar code reader, the other bar code reader retracts the current one from the label read position and continues the read processing. If the substitute read processing succeeds, the initial library device is regarded as abnormal. If the substitute read processing fails, the cartridge or either of the bar code readers is reported as abnormal.

The third embodiment of this invention is a large-capacity storage device based on the first embodiment, where the media transporting device consisting of a gripping mechanism for gripping a cartridge and a mechanism surrounding frame equipped with a bar code reader for reading data from a label on the gripped cartridge has another bar code reader at a frame position opposing the side of a cartridge in a cell gripped by the gripping mechanism.

This other bar code reader enables the media transporting device to read both the back and side bar code labels on a cartridge. If no label is detected on a cartridge, the label reading device outputs an instruction signal to the media transporting device for rechecking the cartridge for a label. In accordance with this instruction, the media transporting device grips the cartridge for the two bar code readers to check the cartridge for a label.

The fourth object is realized by a library device of the above forms, where the label reading device is installed at a downstream rotation side of the cell drum against the cartridge entry-exit door for the cell drum. Consequently, when a cartridge is inserted through the door and the cell drum rotates to another cartridge entry position, the label reading device can read the first cartridge. This reduces the bar code label read time after the operator finishes DEE work.

In the fifth embodiment of this invention, a library device of the above forms is again provided, where the label reading device stores bar code label data from a single row of cells (block) once in the memory and transfers the data to the host computer together at the end of a block. This reduces the time for reporting bar code data to the host computer.

The sixth object of this invention is achieved by providing a library device of the fifth embodiment, where the label reading device stores any detected error in the memory when reading cartridge labels and reads the master code label at the end of a block to see whether a bar code label exists. This reduces the time for checking a non-labeled cartridge.

BRIEF DESCRIPTION OF THE DRAWINGS

These and other aspects of the invention will be best understood with reference to the accompanying drawings, in which.

DETAILED DESCRIPTION

Figure 1:
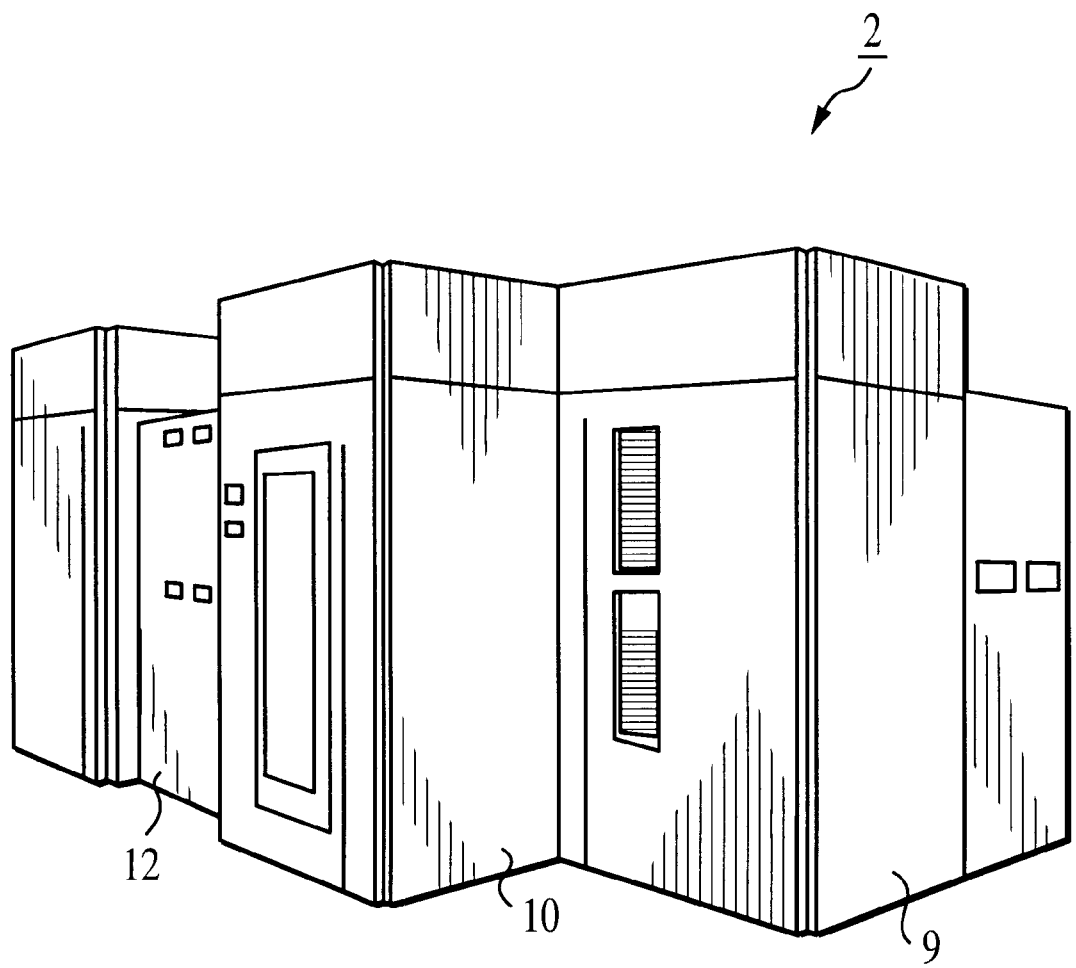
FIG. 1 is an external view of a typical library device.
Figure 2:
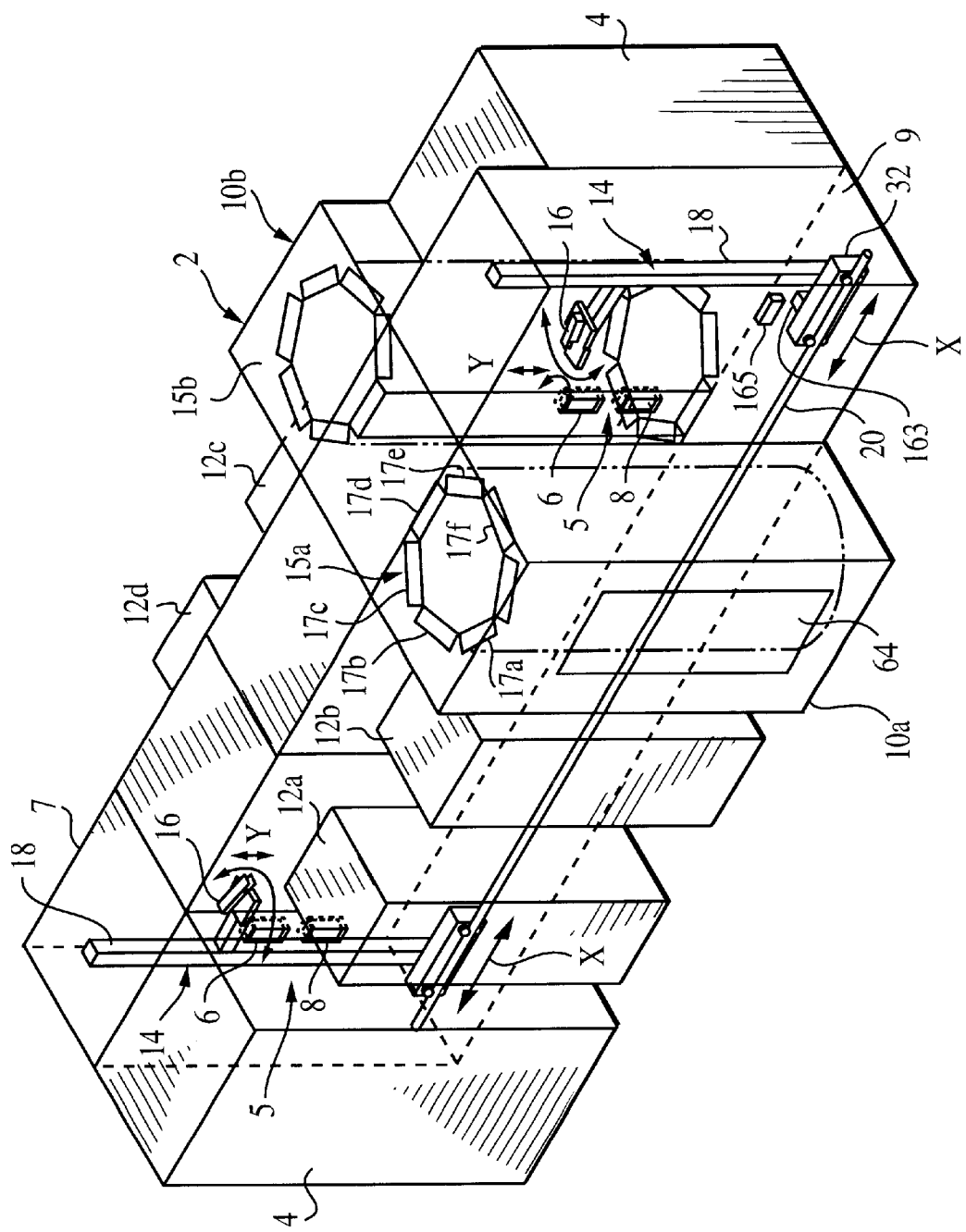
FIG. 2 is a cutaway view showing the internal structure of the library device of FIG. 1.
Figure 3:
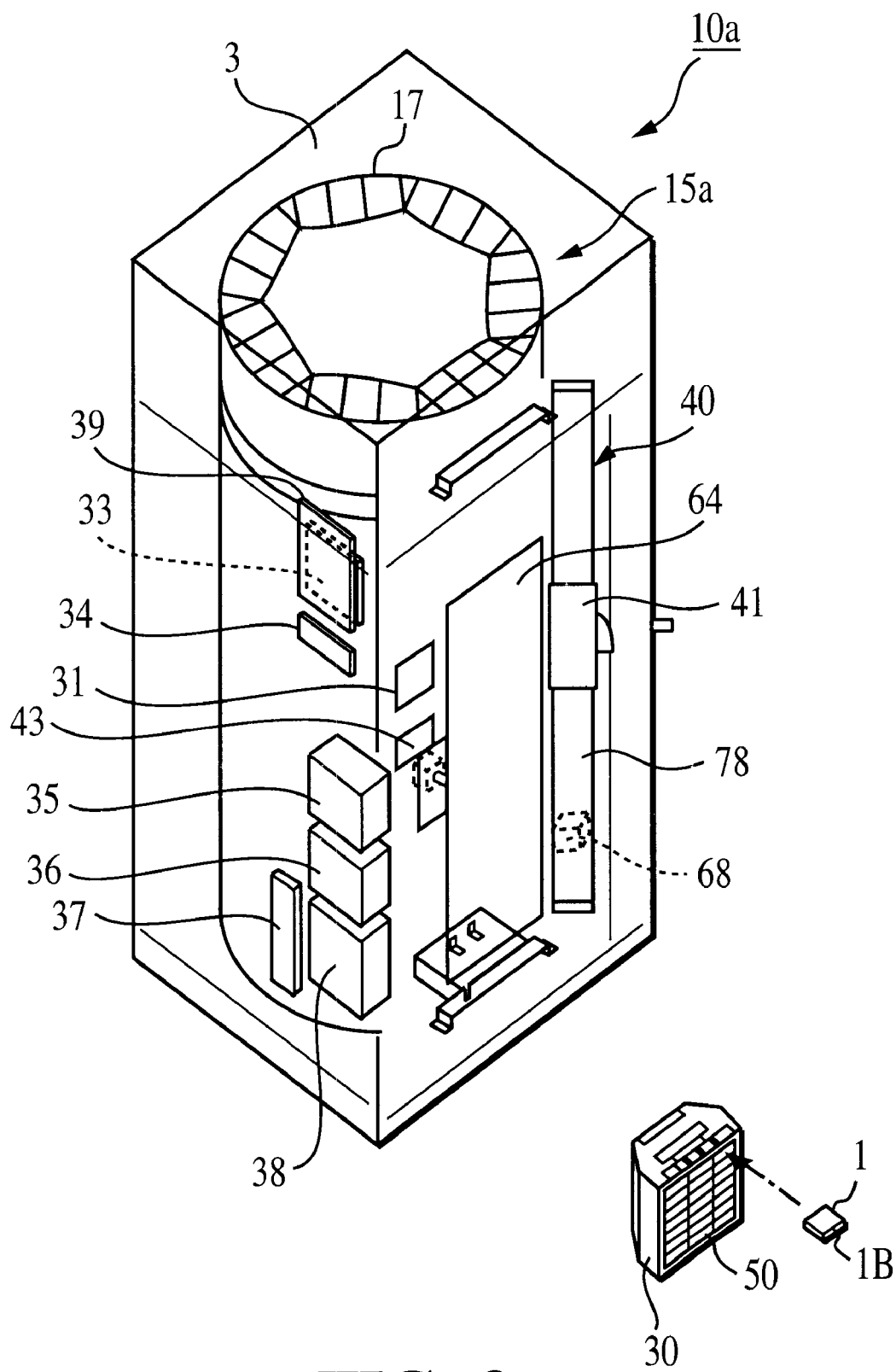
FIG. 3 is a cutaway view showing the internal structure of a drum unit in the library device of FIG. 1.
Figure 12A:
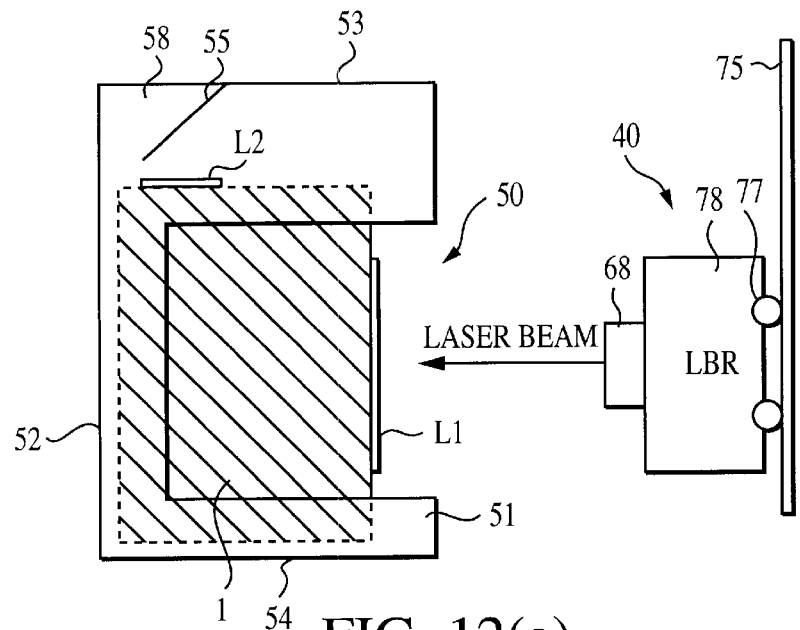
FIG. 12(a) shows processing for reading a back bar code label on a cartridge under an example configuration of cell and LBR based on this invention.

FIG. 12(a) shows the structure of a cell 50 in the cell segment shown in FIG. 3 (one cell 50 in the DEE magazine 30), and the local bar code reader 40. Each cell 50 has a U-shaped frame, a rear panel 52, a right-side wall 53, and a left-side wall 54, and accommodates a cartridge between the upper and lower frame plates of the cell. A cartridge 1 is stored in the cell 50 with the front side facing the rear panel 52. Bar code label L1 is affixed to the back of the cartridge and another bar code label L2 to one side of the cartridge.

The cartridge 1 is stored offset to the left-side wall 54 of the cell 1, to leave a space 58 between the bar code label L2 on the side of the cartridge 1 and the right-side wall 53. In this example, a mirror 55 is installed in the space 58 as a means of guiding laser beams. To reflect an incidence laser beam from the entry of the cell 50 toward the bar code label L2, this mirror 55 is attached to a closer position to the entry on the right-side wall 53 at an angle that is appropriate relative to the bar code label L2 on the cartridge 1.

In this example, the local bar code reader (LBR) 40 installed at a specified distance from the entry of the cell 50 has a vertical column base 78, a bar code reader 68 which moves vertically along a slide rail (not illustrated) on the vertical column base 78, and a rail 75 to move the vertical column base 78 horizontally. The vertical column base 78 has wheels 77 to move on the rail 75. The bar code reader 68 moves vertically on the vertical column base 78 and stops in front of a specified cartridge 1. The bar code reader 68 then shines a laser beam on the bar code label on the cartridge 1 and receives the reflected beam to read the bar code label information.

Figure 12B:
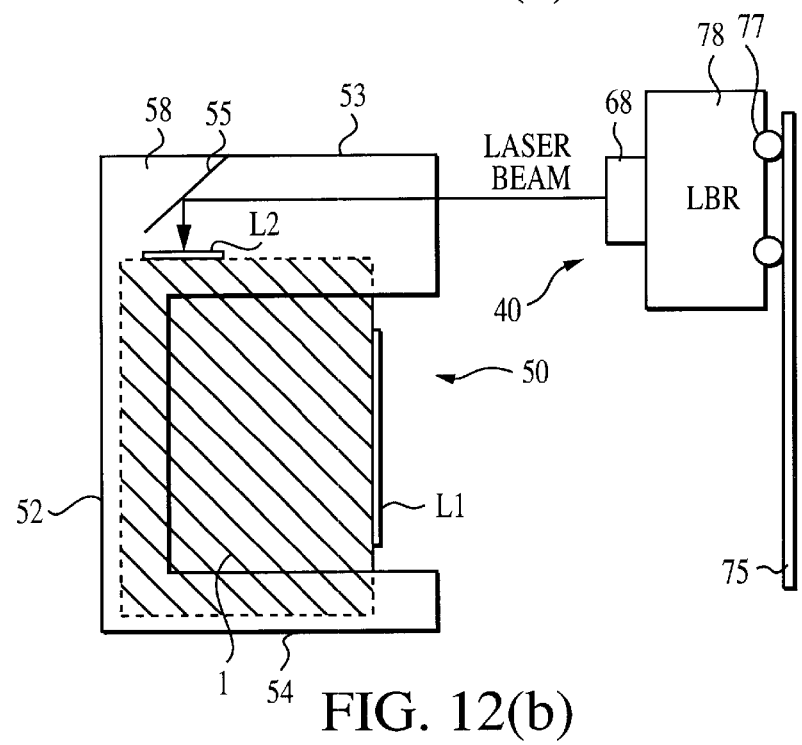
FIG. 12(b) shows processing for reading a side bar code label by LBR under the configuration of FIG. 12(a)

When reading the bar code label L1 on the back of the cartridge 1, the bar code reader 68 is positioned at the center of the back bar code label, as shown in FIG. 12(a). The bar code reader then uses a laser beam to read the back bar code label. When reading the bar code label L1 on one side of the cartridge 1, the vertical column base 78 moves on the rail 75 to position the bar code reader 68 to the reflecting position of the mirror 55 as shown in FIG. 12(b). The bar code reader 68 then shines a laser beam on the mirror 55. Reflected on the mirror 55, the laser beam reaches the side bar code label. The laser beam is reflected again on the mirror 55 and returns to the bar code reader 68. The bar code reader 68 receives this beam to read the bar code label L2 on the side of the cartridge 1.

In addition to the mirror 55 mentioned above, a prism 56 (FIG. 12(c)) can be used as a means of guiding laser beams. In this case, the prism 56 is installed with its reflective surface at the same position as the mirror 55 and its tip is supported by the stay 57 on the right-side wall 53.

Figure 11:
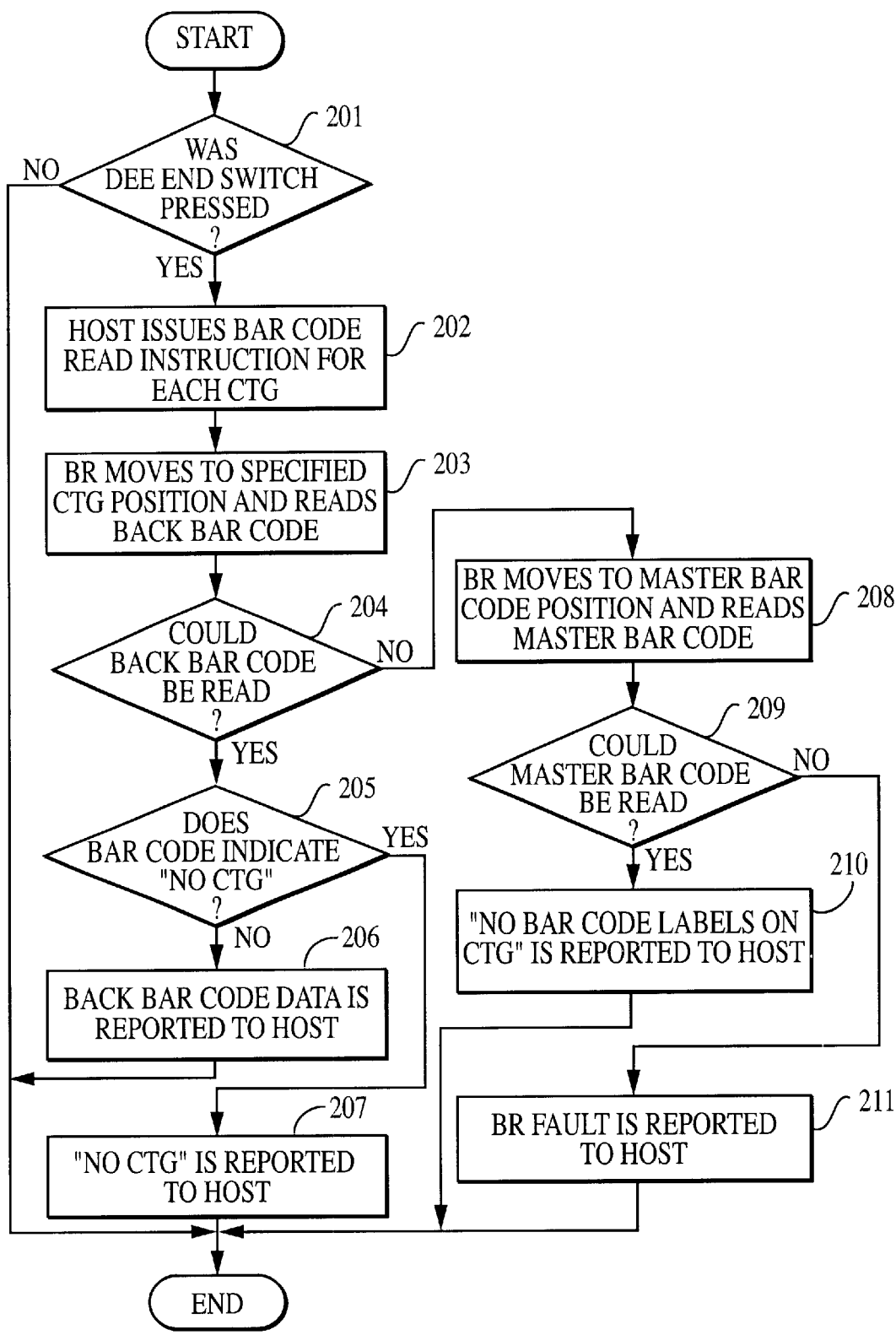
FIG. 11 is a flowchart showing the host computer procedure for checking a cell drum for cartridges.
Figure 12C:
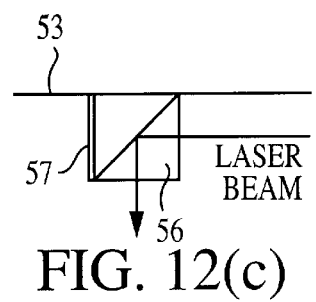
FIG. 12(c) shows another form of this invention where the mirror in FIG. 12(a) is replaced with a prism.
Figure 13:
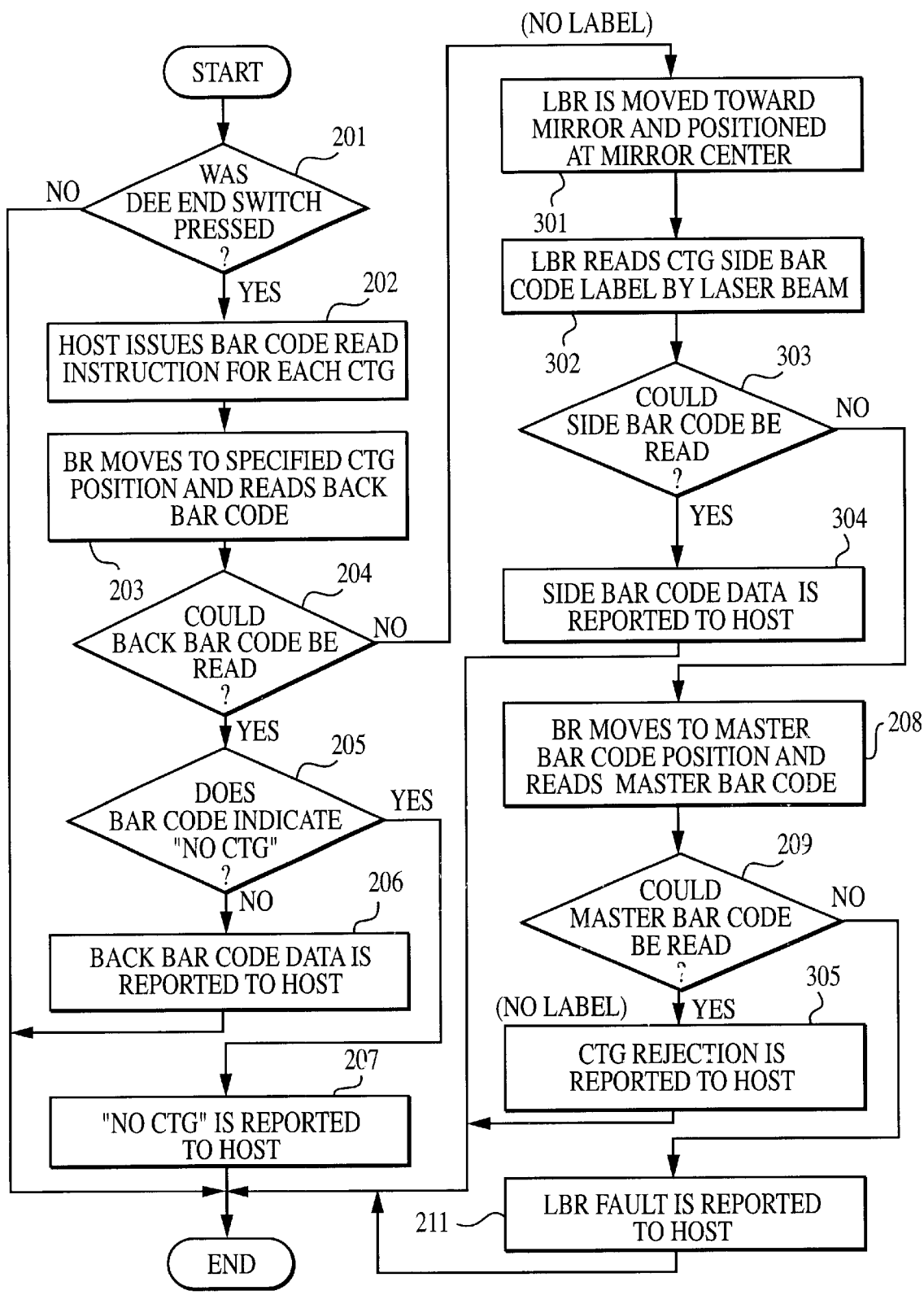
FIG. 13 is a flowchart of a cartridge check procedure by the host computer under the configuration shown in FIG. 12.

FIG. 13 is a flowchart showing the procedure of a host computer reading a label on a cartridge 1 under the configurations of FIGS. 12(a) to 12(c). Since this procedure corresponds to the conventional cartridge check procedure of a host computer explained in FIG. 11, the steps are the same as those in the conventional check procedure.

Step 201 is to check whether the DEE switch was pressed. If the DEE switch was not pressed, this routine terminates. If the DEE switch was pressed, the procedure advances to step 202 where the host computer issues an instruction each time a cartridge is detected to read the bar code label on the cartridge. In step 203, the bar code reader 68 moves to the position of a specified cartridge 1 and reads the back bar code label of the cartridge using a laser beam.

Step 204 is to check whether the back bar code label of the cartridge 1 could be read. If the bar code could be read, the procedure advances to step 205 to check whether the read bar code is the bar code on the no-cartridge label affixed to the rear panel 52 of each cell in the cell drum. If the bar code is not the bar code on the no-cartridge label, the procedure advances to step 206 where data from the back bar code label L1 of the cartridge 1 is reported to the host computer and this routine terminates. If the bar code is the bar code on the no-cartridge label, the procedure advances to step 207 where the absence of a cartridge is reported to the host computer and this routine terminates.

If the bar code could not be read in step 204, the procedure advances to step 301 where the local bar code reader (LBR) 40 is moved toward the mirror 55 and the bar code reader 68 is positioned at the center of the mirror 55. In step 302, the side bar code label of the cartridge 1 is read using a laser beam. Step 303 is to check whether the bar code could be read. If the bar code could be read, the procedure advances to step 304 where the data from the side bar code label is reported to the host computer and this routine terminates.

Figure 4A:
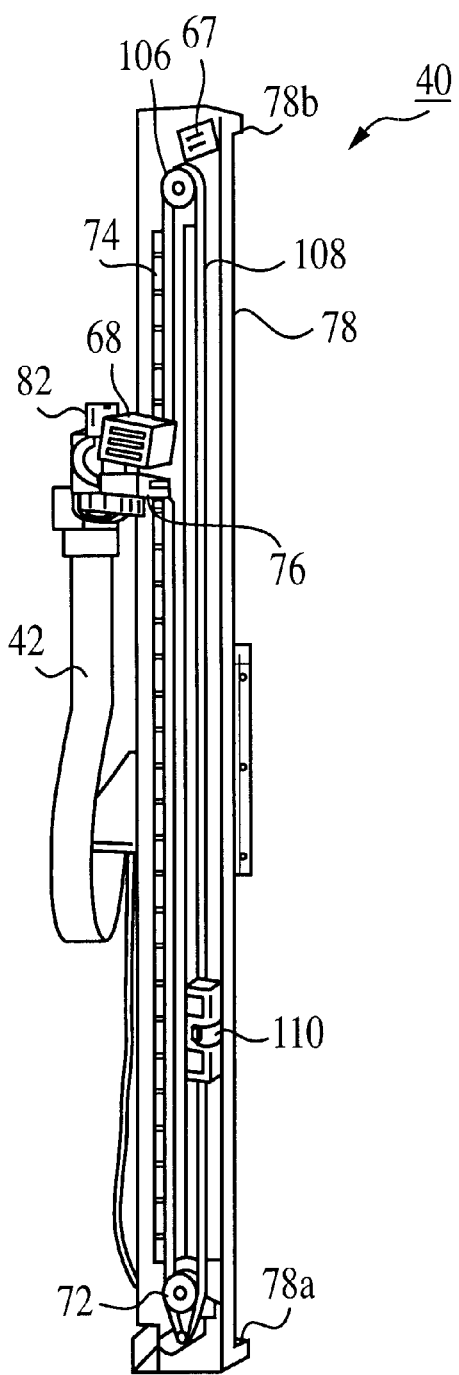
FIG. 4(a) is an isometric view of a local bar code reader in the library device of FIG. 1, viewed from the front.
Figure 4B:
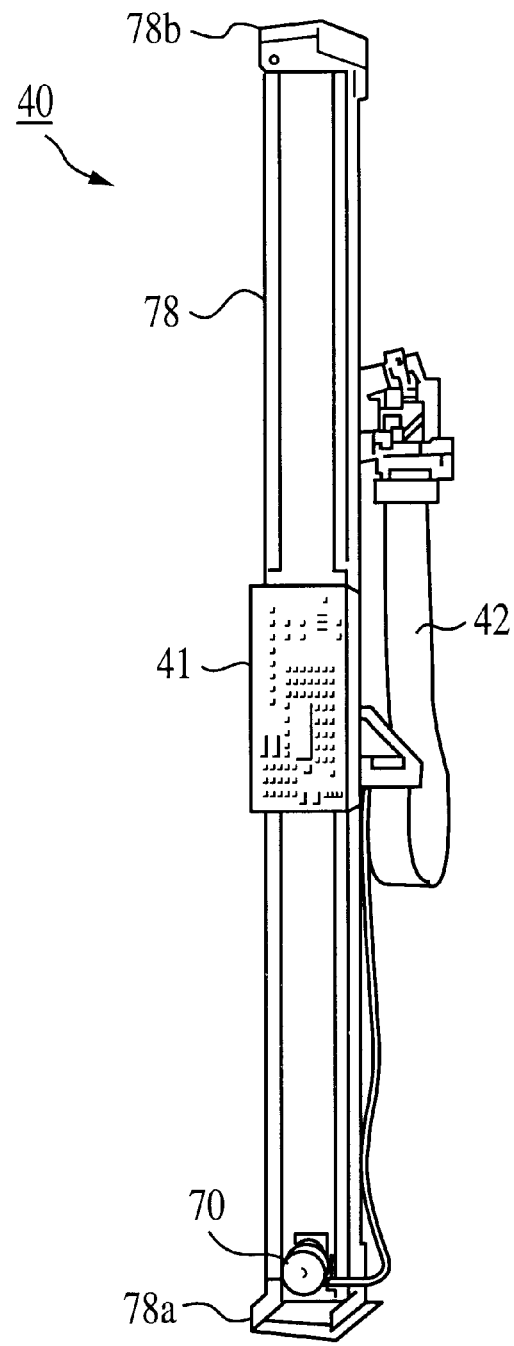
FIG. 4(b) is an isometric view of a local bar code reader in the library device of FIG. 1, viewed from the back.

If the bar code could not be read in step 303, the procedure advances to step 208 where the bar code reader 68 moves to a master bar code label 67 (FIG. 4(a)) and reads the master bar code. Step 209 is to check whether the master bar code 67 could be read. If the master bar code 67 could be read, the procedure advances to step 305 where the rejection of the cartridge 1 is reported to the host computer and this routine terminates. If the master bar code could not be read, the procedure advances to step 211 where a fault of the local bar code reader 40 is reported to the host computer and this routine terminates.

In accordance with the cartridge check procedure in this example, if the bar code could not be read in step 303, the master code 67 is read to see whether the local bar code reader 40 is faulty. However, steps 208, 209, and 211 may be omitted. The bar code reader 68 on the local bar code reader 40 should be checked with the master code for a fault only if a bar code read failure occurs frequently.

Since a bar code label on the back or side or both on the back and side of a cartridge 1 can be read, the library device in this example can handle back-labeled and side-labeled cartridges because it can read bar code labels.

Figure 14A:
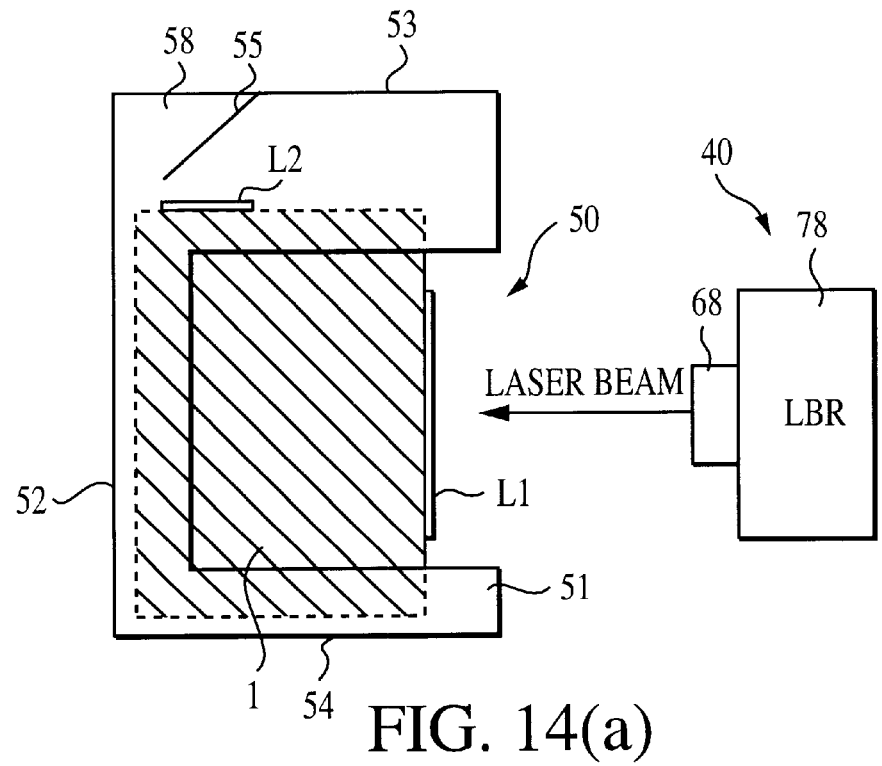
FIG. 14(a) shows processing for reading a back bar code label on a cartridge under an example configuration of cell and LBR based on this invention.

FIG. 14(a) shows an alternative form of this invention in which a cell 50 and a local bar code reader 40 are altered from the one shown in FIG. 12(a). The cell 50 in FIG. 14(a) has the same structure as the one in FIG. 12(a). What is different from the example in FIG. 12 is that the rail 75 does not exist and the local bar code reader 40 does not have the wheels 77. In FIG. 12, the local bar code reader 40 moves along the rail 75 to the position of the mirror 55 to read the bar code label L2 on the side of the cartridge 1. In this example, however, the cell drum storing the cell 50 is rotated in a known manner to move the cell 50 so that the mirror 55 is oriented toward the center of the bar code reader 68. Although the bar code reader 68 shines a laser beam at an angle askew with the mirror, a rotation mechanism may be attached to the local bar code reader 40 to rotate the bar code reader 68 toward the mirror 55.

Figure 14B:
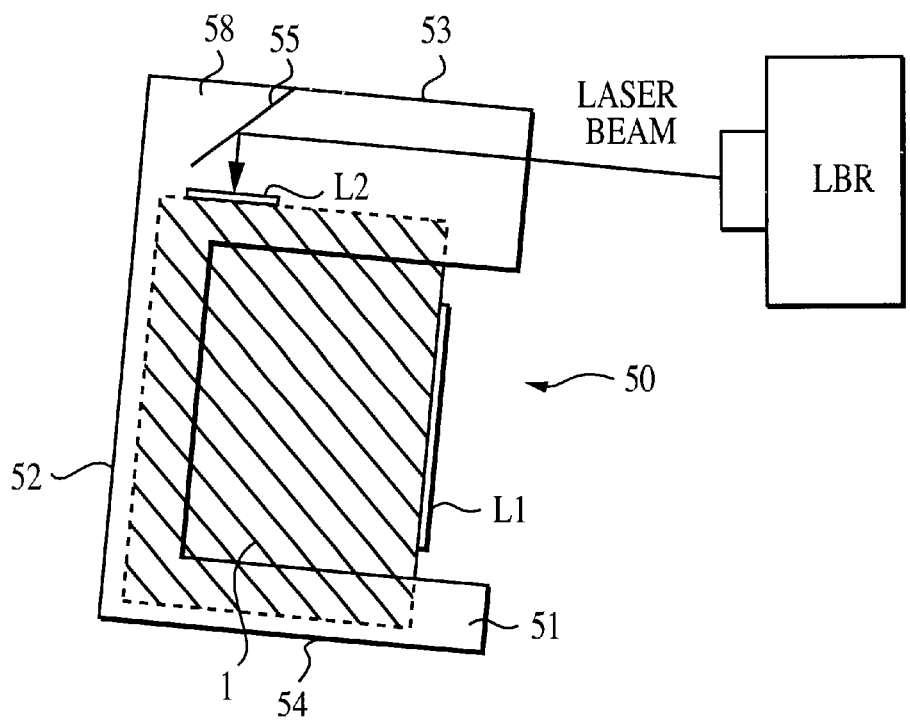
FIG. 14(b) shows processing for reading a back bar code label by LBR under the configuration of FIG. 14(a).
Figure 15:
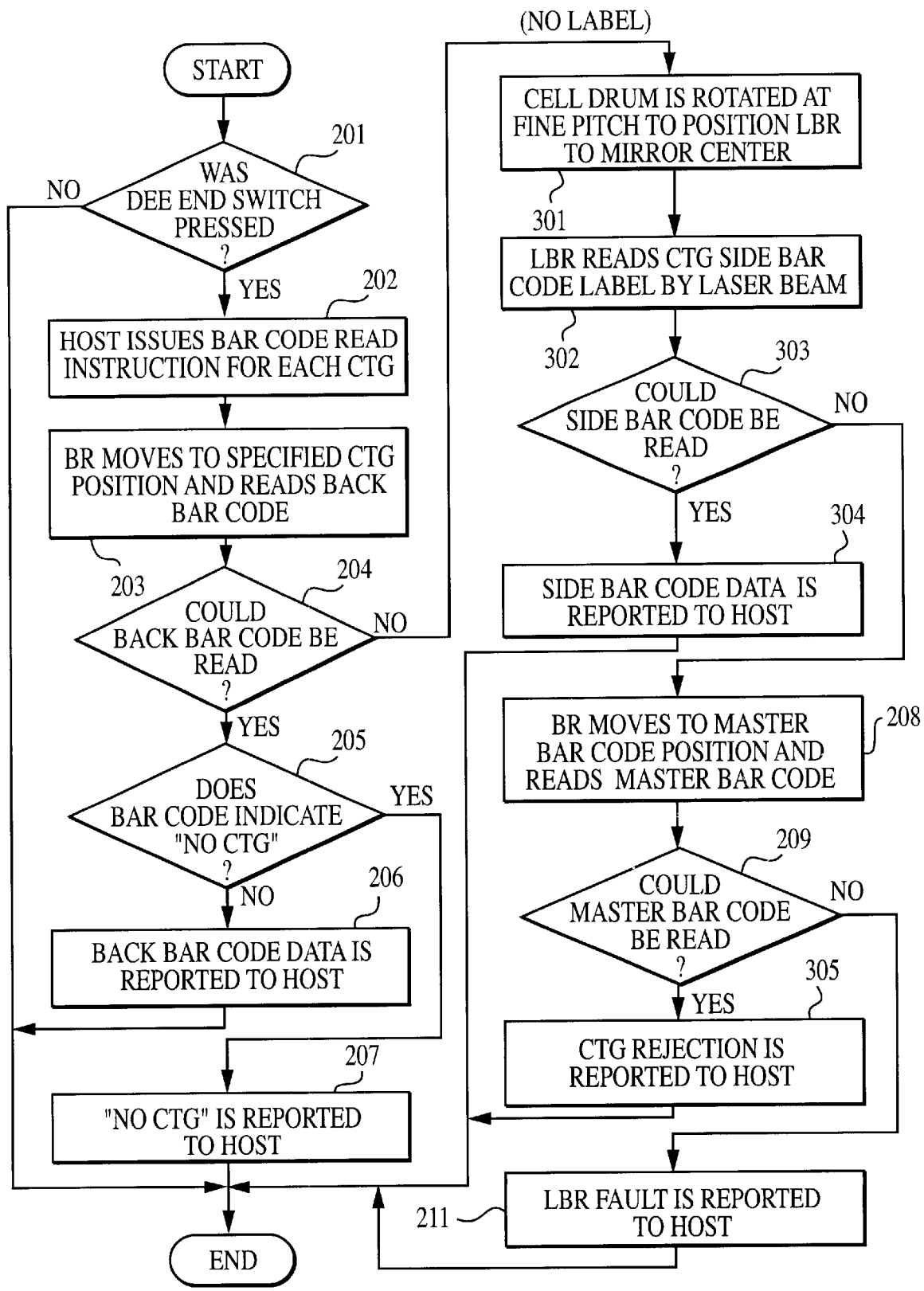
FIG. 15 is another flowchart showing a cartridge check procedure by the host computer under the configuration shown in FIG. 14.

FIG. 15 is a flowchart showing the procedure of a host computer reading a label on a cartridge 1 under the configurations of FIGS. 14(a) and 14(b). Since the cartridge label read procedure for the altered configuration is exactly the same as the one explained in FIG. 13 except step 301, the same steps as the ones in FIG. 13 are numbered in the same manner.

In FIG. 13, if the bar code could not be read in step 204, the local bar code reader 40 is moved toward the mirror 55 in step 301 to read the side bar code label of the cartridge 1. In FIG. 15, if the bar code could not be read in step 204, the cell drum turns at a fine pitch to align the centers of the local bar code reader 40 and the mirror 55 in step 301' to read the side bar code label of the cartridge 1.

Figure 16:
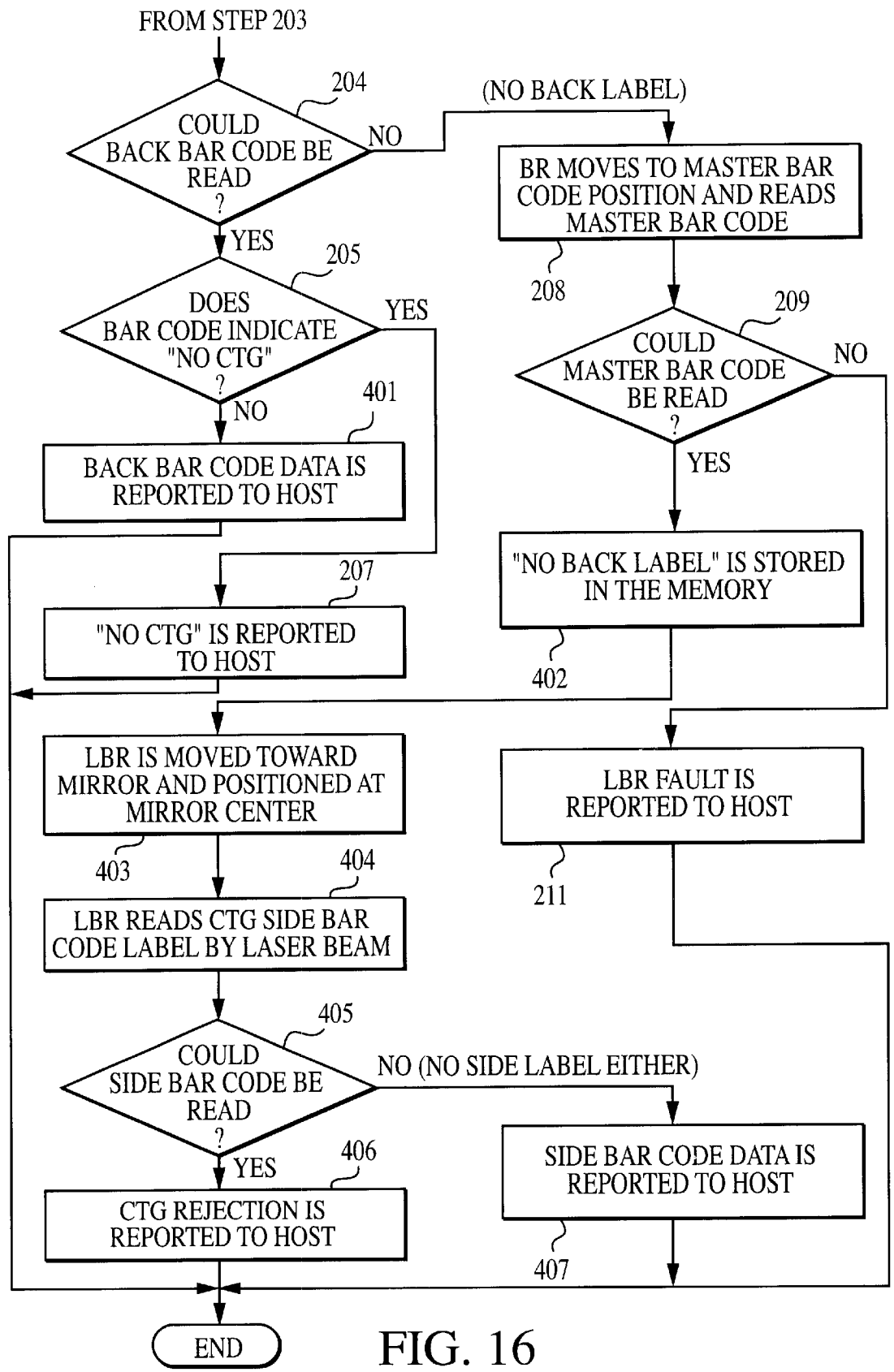
FIG. 16 is yet another flowchart, showing a cartridge check procedure by the host computer under the configuration shown in FIG. 12.

FIG. 16 is a flowchart showing the second procedure of a host computer reading a label on a cartridge 1 under the configuration shown in FIG. 12(a). Since steps 201 to 203 are exactly the same as those in FIG. 13, their explanations are omitted here. The same steps as the ones in FIG. 13 are numbered in the same manner.

In the second example, if the back bar code of the cartridge 1 cannot be read, the information of the cartridge is read from the side bar code label of the cartridge.

Step 204 is to check whether the back bar code label of the cartridge 1 could be read. If the bar code could be read, the procedure advances to step 205 to check whether the read bar code is the bar code on the no-cartridge label affixed to the rear panel 52 of each cell 50 in the cell drum. If the bar code is not the bar code on the no-cartridge label, the procedure advances to step 401 where data from the back bar code label of the cartridge 1 is reported to the host computer and this routine terminates.

If the bar code read in step 205 is the bar code on the no-cartridge label, the procedure advances to step 207 where the absence of a cartridge is reported to the host computer and this routine terminates.

If the bar code could not be read in step 204, the procedure advances to step 208 where the bar code reader 68 moves to the master bar code label 67 (FIG. 4(a)) and reads the master bar code. Step 209 is to check whether the master bar code could be read. If the master bar code could be read, the procedure advances to step 402 where the absence of a side bar code label on the cartridge 1 is stored in the memory. The procedure then advances to step 403. If the master bar code could not be read, the procedure advances to step 211 where a fault of the local bar code reader 40 is reported to the host computer and this routine terminates.

In step 403, the local bar code reader (LBR) 40 is moved toward the mirror 55 and the bar code reader 68 is positioned at the center of the mirror 55. In step 404, the side bar code label of the cartridge 1 is read using a laser beam. Step 405 is to check whether the bar code could be read. If the bar code could be read, the procedure advances to step 406 where the data from the side bar code label is reported to the host computer and this routine terminates. If the bar code could not be read in step 405, the procedure advances to step 407. However, since the cartridge 1 has no bar code on the back or side, the rejection of the cartridge 1 is reported to the host computer and this routine terminates.

In the second example, the entry of the cartridge 1 into the library device 2 is not rejected if the cartridge has a bar code label not on the back but on the side.

Figure 17:
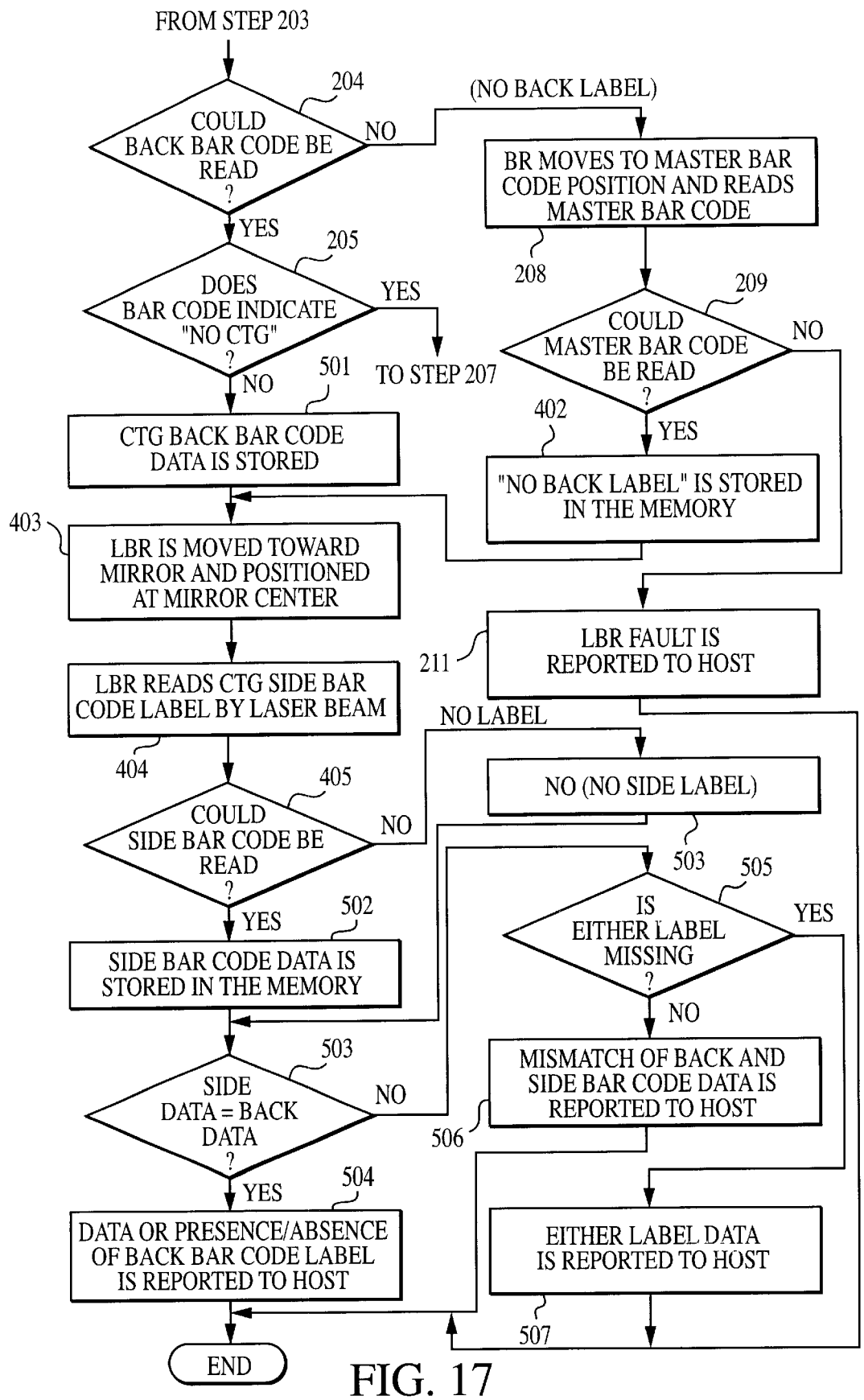
FIG. 17 is a flowchart which shows a cartridge check procedure by the host computer under the configuration shown in FIG. 12.

FIG. 17 is a flowchart showing the third procedure of a host computer reading a label on a cartridge 1 under the configuration shown in FIG. 12(a). Since steps 201 to 203 are exactly the same as those in FIG. 13, their explanations are omitted here. The same steps as the ones in FIG. 13 are numbered in the same manner.

In the third example, the back and side bar code labels of the cartridge 1 are collated to enhance the bar code label read precision. The library device also checks whether the cartridge 1 has only the back or side bar code label or no bar code label or whether the bar code label is faulty.

Step 204 is to check whether the back bar code label of the cartridge 1 could be read. If the bar code could be read, the procedure advances to step 205 to check whether the read bar code is the bar code on the no-cartridge label affixed to the rear panel 52 of each cell 50 in the cell drum. If the bar code is not the bar code on the no-cartridge label, the procedure advances to step 501 where data from the back bar code label of the cartridge 1 is stored in the memory. The procedure then advances to step 402. If the bar code read in step 205 is the bar code on the no-cartridge label, the procedure advances to step 207 where the absence of a cartridge is reported to the host computer and this routine terminates.

If the bar code could not be read in step 204, the procedure advances to step 208 where the bar code reader 68 moves to the master bar code label 67 and reads the master bar code. Step 209 is to check whether the master bar code could be read. If the master bar code could be read, the procedure advances to step 402 where the absence of a back bar code label on the cartridge 1 is stored in the memory. The procedure then advances to step 403. If the master bar code could not be read, the procedure advances to step 211 where a fault of the local bar code reader 40 is reported to the host computer and this routine terminates.

In step 403, the local bar code reader (LBR) 40 is moved toward the mirror 55 and the bar code reader 68 is positioned at the center of the mirror 55. In step 404, the side bar code label of the cartridge 1 is read using a laser beam. Step 405 is to check whether the bar code could be read. If the bar code could be read, the procedure advances to step 502 where data from the side bar code label of the cartridge 1 is stored in the memory. The procedure then advances to step 503. If the bar code could not be read in step 405, the procedure advances to step 503 where the absence of a side bar code label on the cartridge 1 is stored in the memory. The procedure then advances to step 503.

Step 503 is to check whether data from the back bar code label of the cartridge 1 stored in steps 402 and 501 matches that from the side bar code label of the cartridge 1 stored in steps 502 and 503. A data match means that the cartridge 1 has the same bar code labels on the back and side or has no bar code labels. Therefore, if the back and side bar code labels of the cartridge 1 match in step 503, the procedure advances to step 504. In step 504, data from the back bar code label of the cartridge 1 or the absence of bar code labels on the cartridge 1 is reported to the host computer and this routine terminates.

If the back and side bar code labels of the cartridge 1 do not match in step 503, the procedure advances to step 505 to check whether the data mismatch is attributable to the absence of a back or side bar code label on the cartridge 1. In other words, step 505 is to check whether the back or side bar code label is missing from the cartridge 1. If either the back or side bar code label is missing, the procedure advances to step 507 where data from the existing label is reported to the host computer and this routine terminates. If neither the back nor side bar code label is missing but their data is different, the procedure advances to step 506 where a mismatch of data from the back and side bar code labels on the cartridge 1 is reported to the host computer and this routine terminates.

In the third example, the library device can report a match or mismatch of the back and side bar code labels on the cartridge 1, data from either the back or side bar code label on the cartridge 1, the absence of both bar code labels on the cartridge 1, or a bar code reader fault. In accordance with this report, the host computer can identify the cartridge 1 or reject the entry of the cartridge into the library device 2.

Figure 18A:
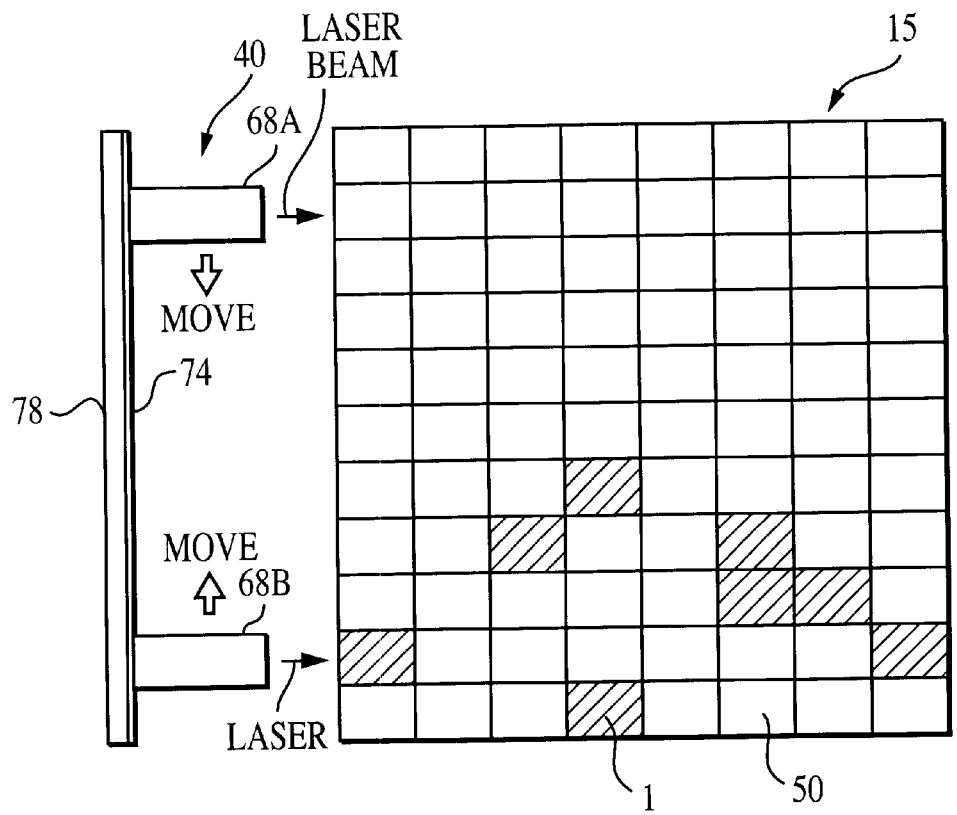
FIG. 18(a) shows an example of LBR structure for a library device based on this invention.

FIG. 18(a) shows an example form of this invention about the local bar code reader 40 in the library device 2. In this example, two bar code readers 68A, 68B are mounted on the same slide rail 74 on the vertical column base 78 of the local bar code reader 40 for vertical movement. The upper bar code reader 68A can move down and the lower bar code reader 68B can move up to the center of the cell drum 15.

Figure 18B:
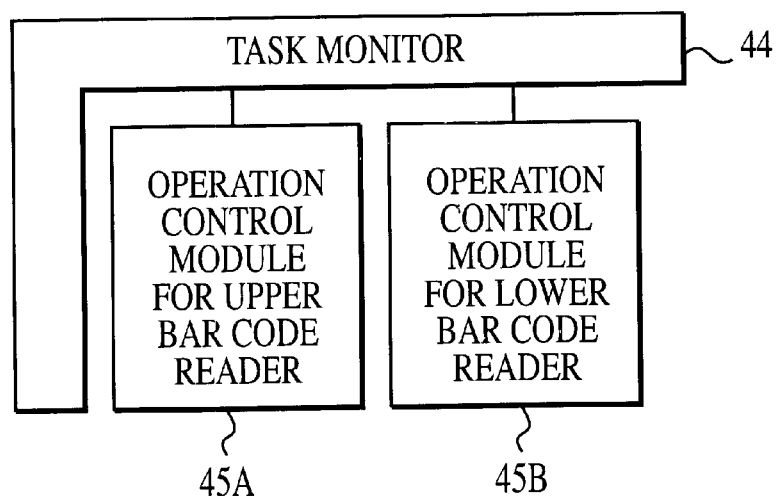
FIG. 18(b) is a block diagram of the control circuit for the LBR shown in FIG. 18(a)

FIG. 18(b) is a block diagram showing the control circuits for the two bar code readers 68A, 68B. The control programs have a multitask structure to operate the two bar code readers simultaneously. Therefore, the operation control module 45A for the upper bar code reader 68A and the operation control module 45B for the upper bar code reader 68B are connected to the task monitor 44.

Under this configuration, the two bar code readers 68A, 68B can independently read bar code labels on cartridges 1 stored in cells 50 of the cell drum.

Figure 19:
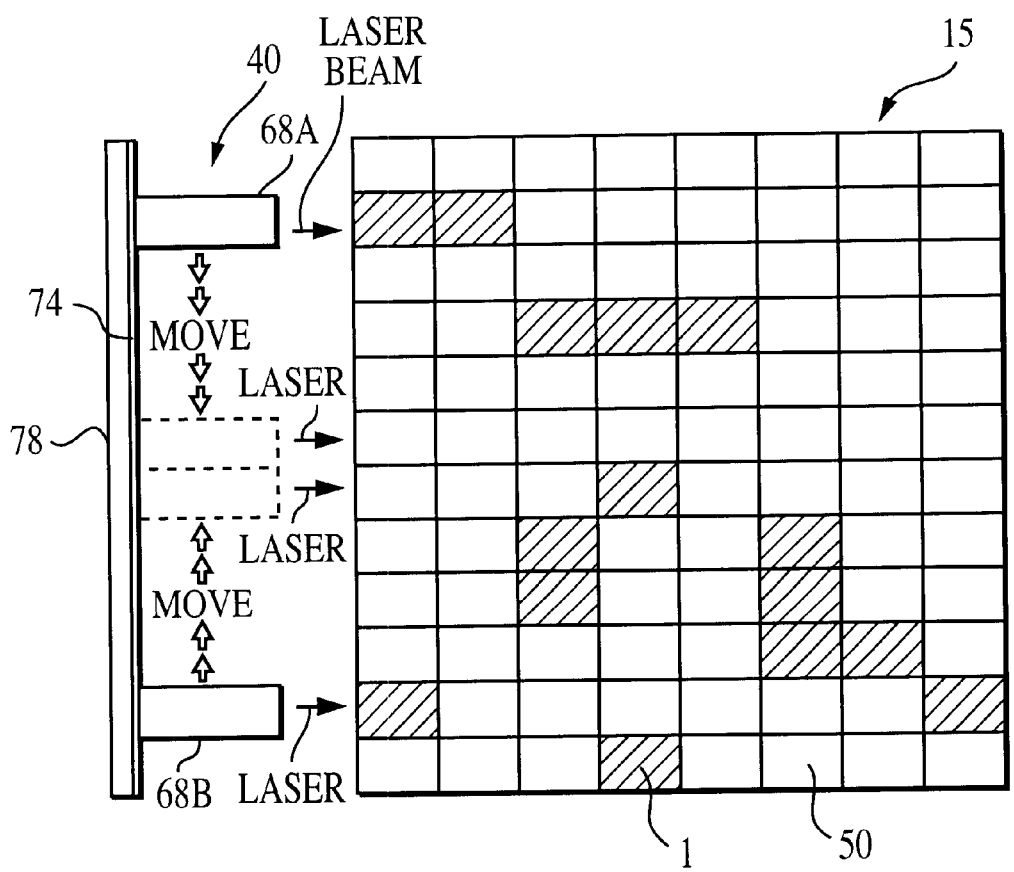
FIG. 19 gives an example of control for the LBR shown in FIG. 18.

FIG. 19 shows an example of control for the two bar code readers 68A, 68B in the local bar code reader 40 shown in FIG. 18. In this example, the moving range of the upper bar code reader 68A is limited from the top to the center of the cell drum 15 while that of the lower bar code reader 68B is limited from the bottom to the center of the cell drum 15. This halves the time for the bar code readers 68A, 68B to read bar code labels on cartridges 1 stored in the cell drum 15.

FIGS. 20(a) to 20(d) show positioning control of the two bar code readers 68A, 68B in the local bar code reader 40 shown in FIG. 18. Although positioning control is explained only with regard to the upper bar code reader 68A for easy understanding, the same positioning control applies to the lower bar code reader 68B.

In FIG. 20(a), the bar code reader 68A is moved from the home position (above the cell drum height) at the top of the vertical column base 78 to the dotted line position by sliding on the slide rail 74. If an operation error occurs during this positioning and the bar code reader 68A stops halfway, as shown in FIG. 20(b), the bar code reader 68A is returned once to the home position at the top as shown in FIG. 20(c) for initialization. As FIG. 20(d) shows, the bar code reader is then moved to the dotted line position in FIG. 20(a). If an operation error occurs, the bar code reader 68A is returned once to the home position. This initialization may clear the operation error.

Figure 20:
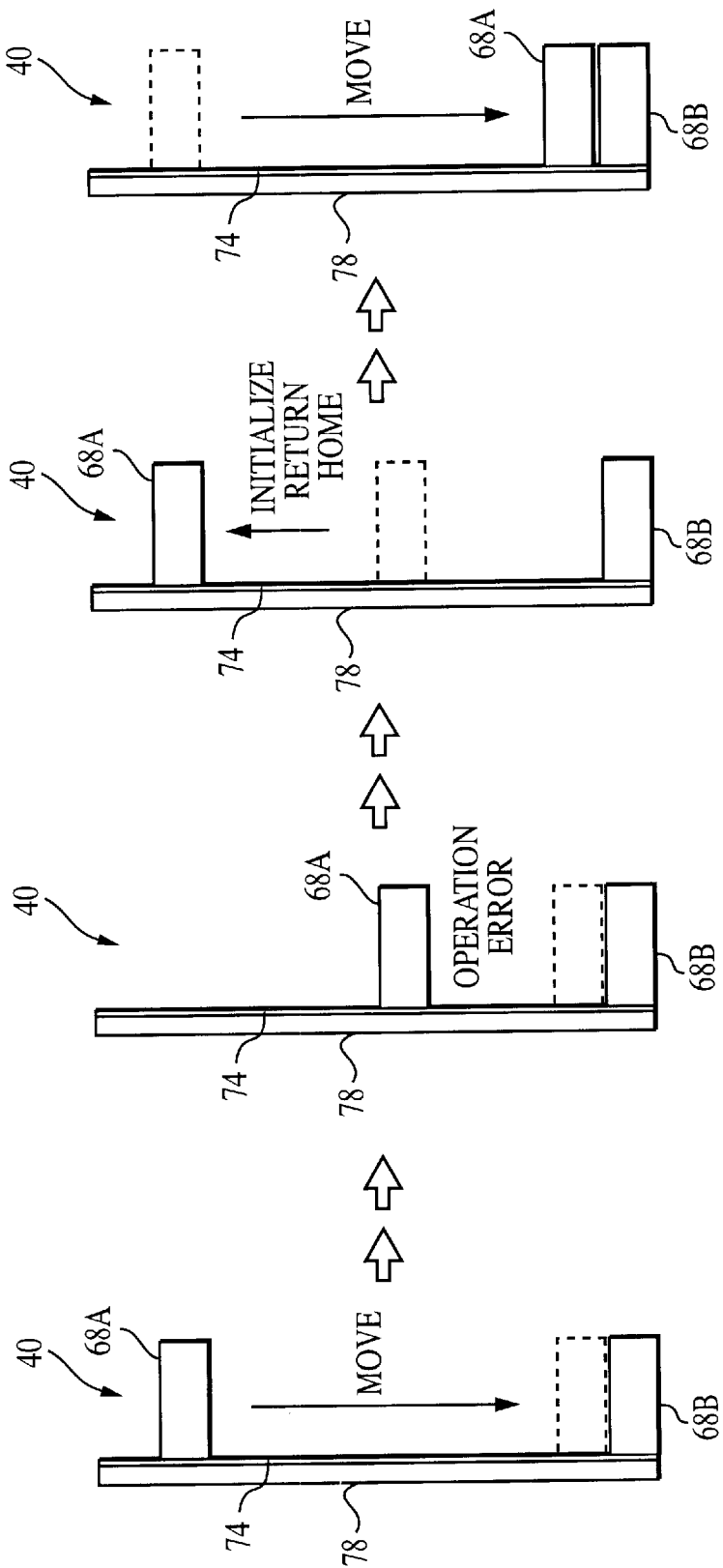
FIGS. 20(a) to (d) explain LBR positioning control in this invention.
Figure 21:
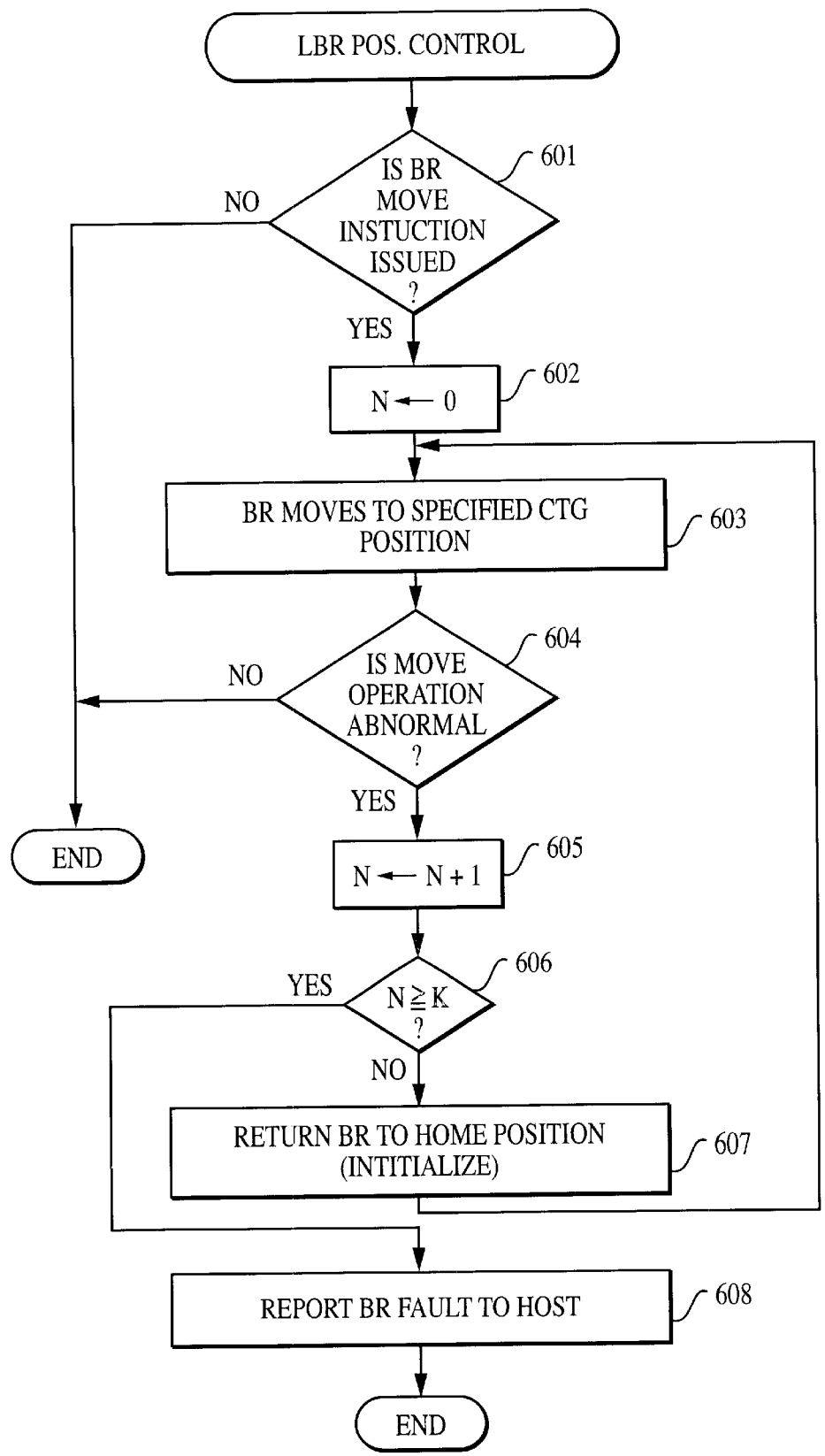
FIG. 21 is a flowchart which shows the procedure for LBR positioning control explained in FIG. 20.

FIG. 21 is a flowchart showing the positioning control procedure for the bar code reader 68A shown in FIG. 20. In the flowchart, a bar code reader is abbreviated as BR. Step 601 is to check for a move instruction to the bar code reader 68A. If there is a no move instruction, this routine terminates. If there is a move instruction, the procedure advances to step 602. In step 602, the initial value of the number of retries (retry count) for positioning the bar code reader 68A at the same position is set to 0. In the next step 603, the bar code reader 68A moves to the position of a specified cartridge 1.

Step 604 is to check whether the bar code reader 68A was positioned without any operation error. If no operation error is detected, this routine terminates. If an operation error is detected, the procedure advances to step 605 where the retry count N is incremented by one. If the procedure has reached step 605 only after a move instruction, the retry count N becomes 1.

Step 606 is to check whether the retry count N has become the specified value K or greater. If N is smaller than K, the procedure advances to step 607 and the bar code reader 68A is returned to the home position for initialization. After this initialization, the procedure returns to step 603, where the bar code reader 68A moves to the position of a specified cartridge 1. If no operation error occurs, the check in step 604 ends in "No operation error" and this routine terminates. If an operation error occurs continuously, the procedure sequence of step 605 !!→!! step 606 !!→!! step 607 !!→!! step 603 !!→!! step 604 is repeated.

If N becomes equal to K or greater during the retry processing, the procedure advances to step 608 where a fault of the bar code reader 68A is reported to the host computer and this routine terminates. The K value may be 3 to 5.

In this example, even if an operation error disables the bar code reader 68A to prevent it from moving to the position of a specified cartridge 1, the bar code reader 68A is not immediately regarded as abnormal. If an operation error occurs, the bar code reader 68A is returned to the home position once to retry positioning. This retry is repeated a specified number of times. If positioning succeeds in one of the retries, the bar code reader 68A reads the bar code label of the cartridge 1 again. This enhances the reliability of the local bar code reader 40.

FIGS. 22(a) to 22(d) explain another example of positioning control for the bar code reader 68 of the local bar code reader 40 under the configuration shown in FIG. 18.

In FIG. 22(a), the bar code reader 68A is moved from the home position (above the cell drum height) at the top of the vertical column base 78 to the dotted line position by sliding on the slide rail 74. If an operation error occurs during this positioning and the bar code reader 68A stops halfway, as shown in FIG. 22(b), the other bar code reader 68B is moved. The faulty bar code reader 68A is pushed to the home position beyond the cell drum height, as shown in FIG. 22(c), and the other bar code reader 68B is moved to the read position, as shown in FIG. 22(d). In this example, if an operation error occurs in the bar code reader 68A, the other bar code reader 68B retracts the current one 68A and continues the read processing.

Figure 22:
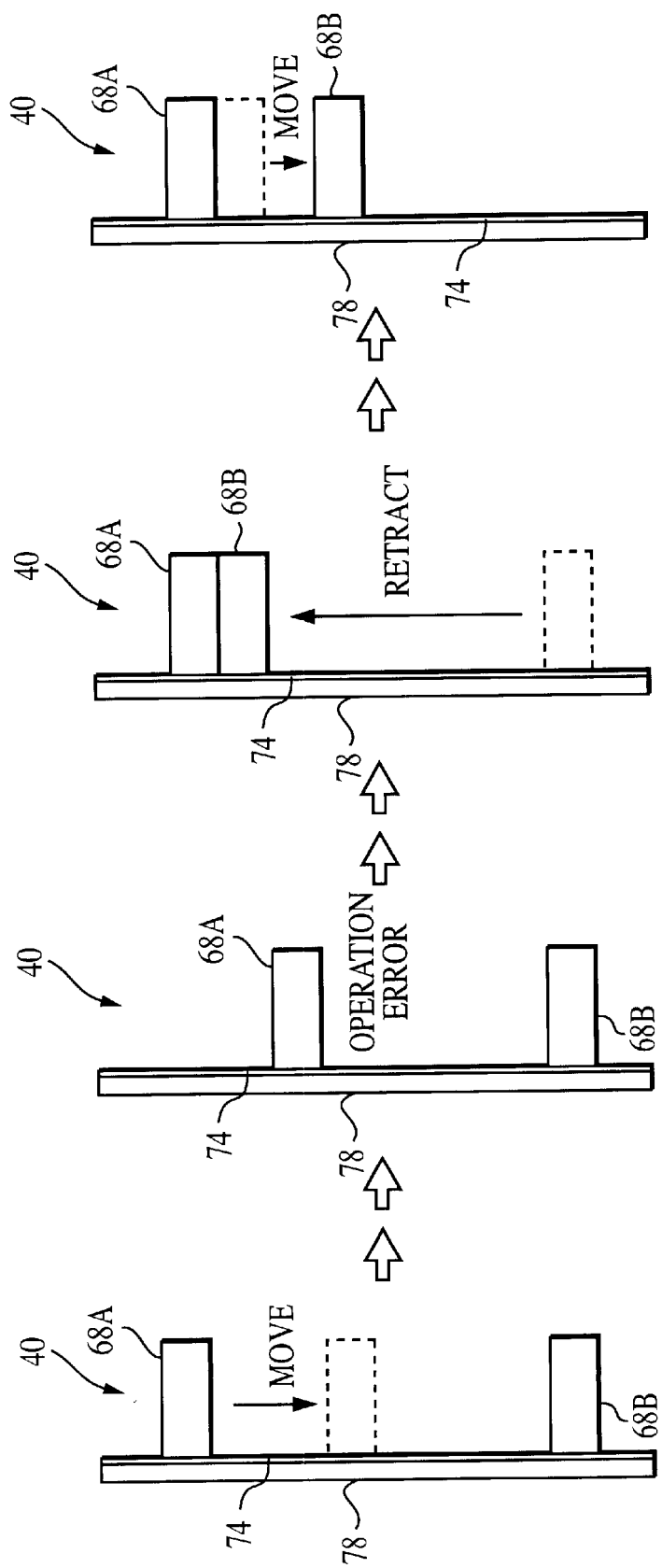
FIGS. 22(a) to (d) explain positioning control for the LBR shown in FIG. 18.
Figure 23:
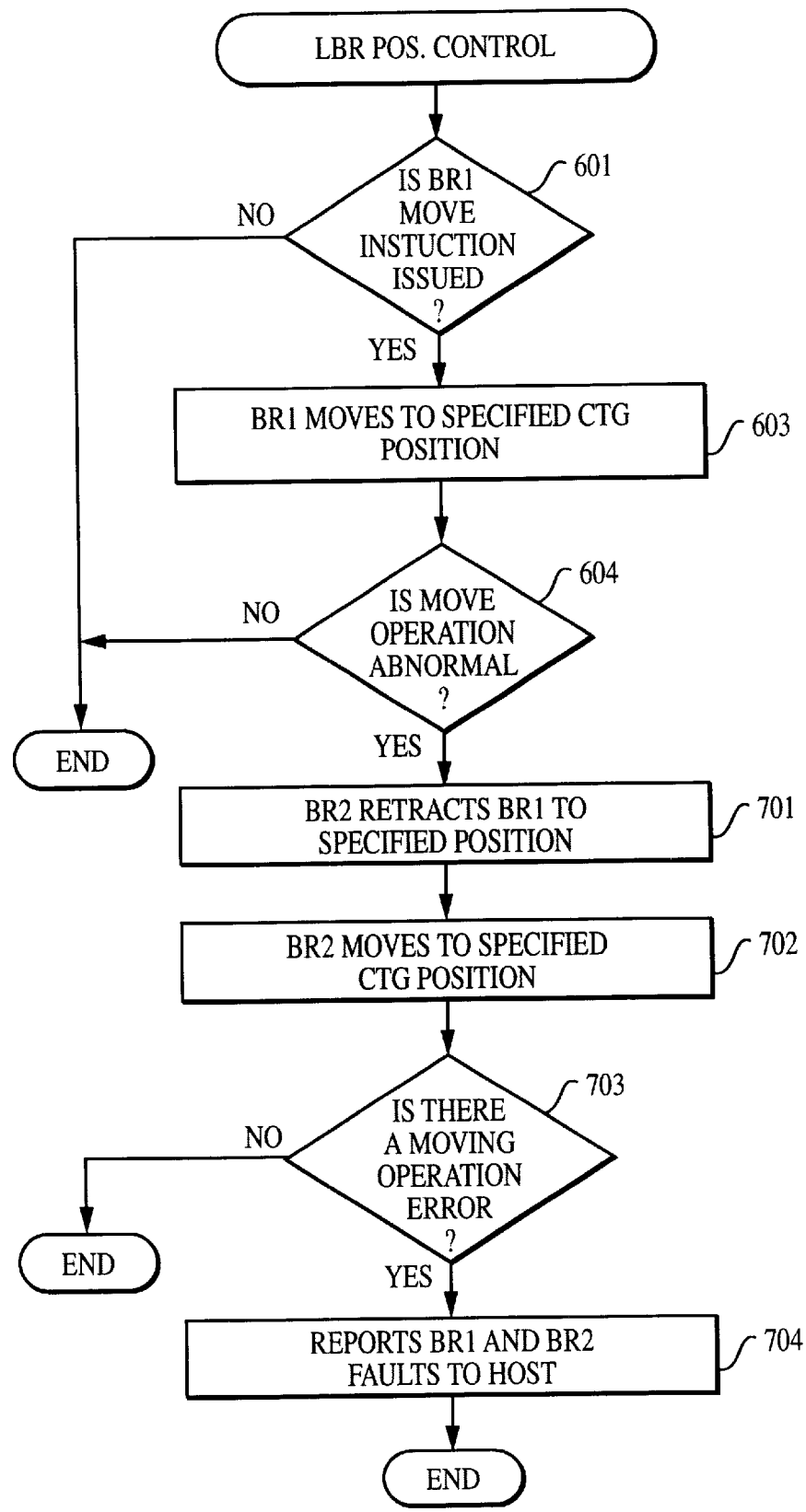
FIG. 23 is a flowchart which shows the procedure for LBR positioning control explained in FIG. 22.

FIG. 23 is a flowchart showing the positioning control procedure for the bar code readers 68A, 68B shown in FIG. 22. In the flowchart, the bar code reader 68A is abbreviated as BR1 and the other (68B) as BR2. The same control steps as those in the flowchart of FIG. 21 are numbered in the same manner.

Step 601 is to check for a move instruction to the bar code reader 68A (BR1). If there is no move instruction, this routine terminates. If there is a move instruction, the procedure advances to step 603 where the bar code reader 68A (BR1) moves to the position of a specified cartridge 1. Step 604 is to check whether the bar code reader 68A (BR1) was positioned without any operation error. If no operation error is detected, this routine terminates. If an operation error is detected, the procedure advances to step 701.

In step 701, the bar code reader 68B (BR2) retracts the bar code reader 68A (BR1) to the home position. In step 702, the bar code reader 68B (BR2) moves to the position of the specified cartridge. Step 703 is to check whether the bar code reader 68B (BR2) was positioned without any operation error. If no operation error is detected, this routine terminates and the bar code reader 68B (BR2) reads the bar code label on a cartridge 1. If an operation error is detected when the bar code reader 68B (BR2) moves in step 703, faults of both bar code readers 68A, 68B are reported to the host computer and this routine terminates.

In this example, if an operation error occurs in either bar code reader, the other bar code reader backs up the read processing. This enhances the reliability of the library device.

FIGS. 24(a) to 24(d) show the bar code read control and maintenance of the local bar code reader 40 under the configuration shown in FIG. 18. These figures show another positioning control of the bar code reader 68 different from the one shown in FIGS. 23(a) to 23(d).

Figures 24A, 24B, 24C, 24D:
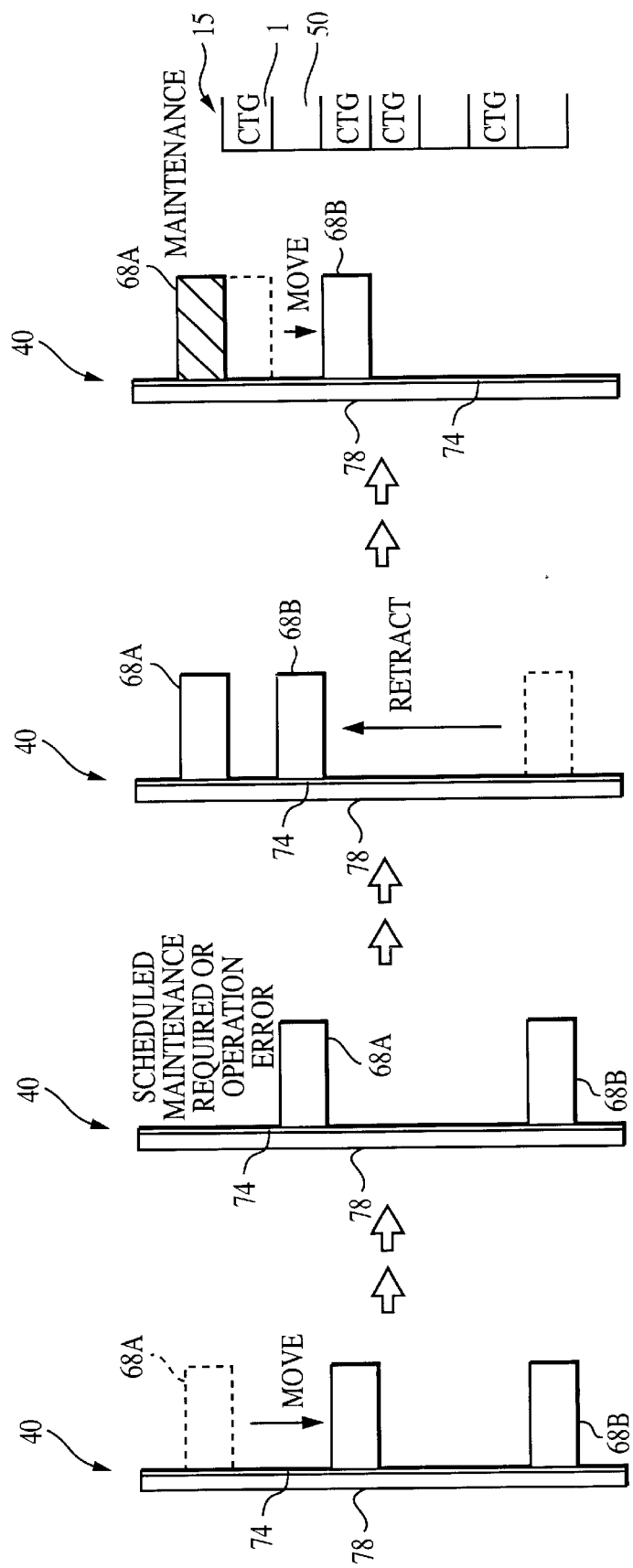
FIGS. 24(a) to (d) explain cartridge read control and maintenance for the LBR shown in FIG. 18.

In FIG. 24(a), the bar code reader 68A is moved from the home position at the top of the vertical column base 78 to the position of a cartridge by sliding on the slide rail 74. Under these circumstances, if the time for performing scheduled maintenance arrives or an operation error occurs as in the example of FIG. 22, the bar code reader 68A returns to the home position above the cell drum height by itself. If an operation error occurs during positioning, the other bar code reader 68B pushes the faulty one 68A to the home position.

As FIG. 24(d) shows, the other bar code reader 68B then continues the read processing. While the bar code reader 68B is reading bar code labels, the retracted one 68A is serviced at the home position.

If the local bar code reader 40 has two bar code readers 68A, 68B, a bar code reader can be serviced for maintenance without interrupting the bar code read processing by the local bar code reader 40.

Figure 25C:
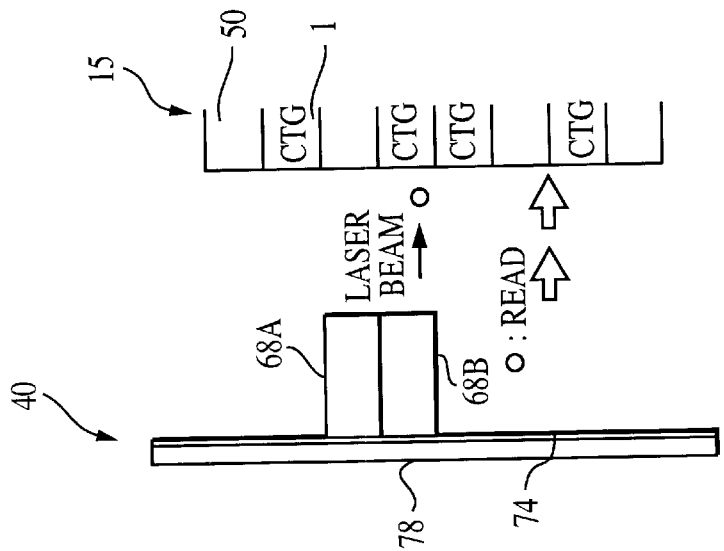
FIGS. 25(a) to (c) explain cartridge read control and error diagnostics using the LBR shown in FIG. 18.
Figure 25B:
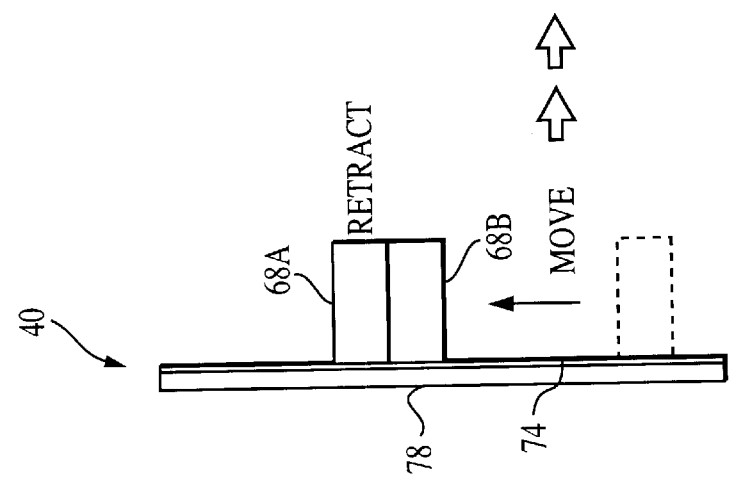
Figure 25A:
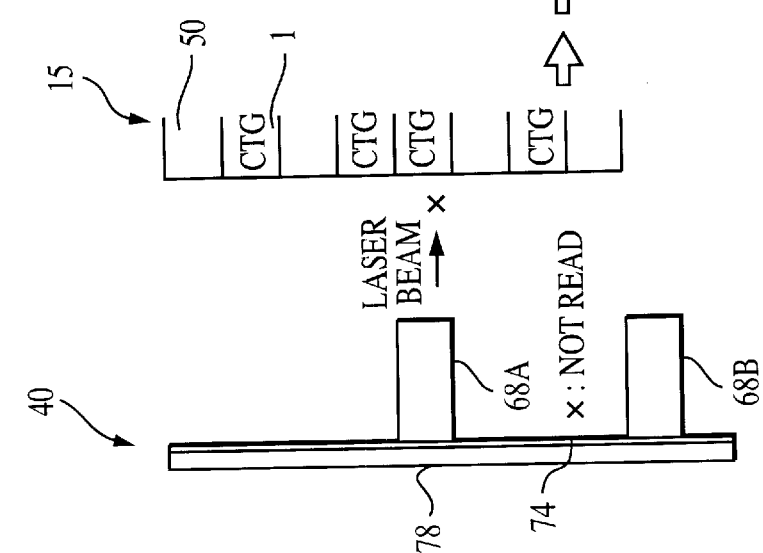

FIGS. 25(a) to 25(c) show an example of bar code read control for a local bar code reader 40 where two bar code readers 68A, 68B can move on the slide rail 74 of the vertical column base 78, as shown in FIG. 18.

In FIG. 25(a), the bar code reader 68A fails to read a bar code label on a cartridge 1 during bar code read processing. The bar code reader 68A is then retracted immediately from the read position and the other one 68B not reading bar code labels is positioned at the same cartridge as that shown in FIG. 25(b). As FIG. 25(c) shows, the bar code reader 68B reads the bar code label on the cartridge.

If the other bar code reader 68B could read the same cartridge, the bar code read failure can be attributed to the bar code reader 68A.

Figure 26:
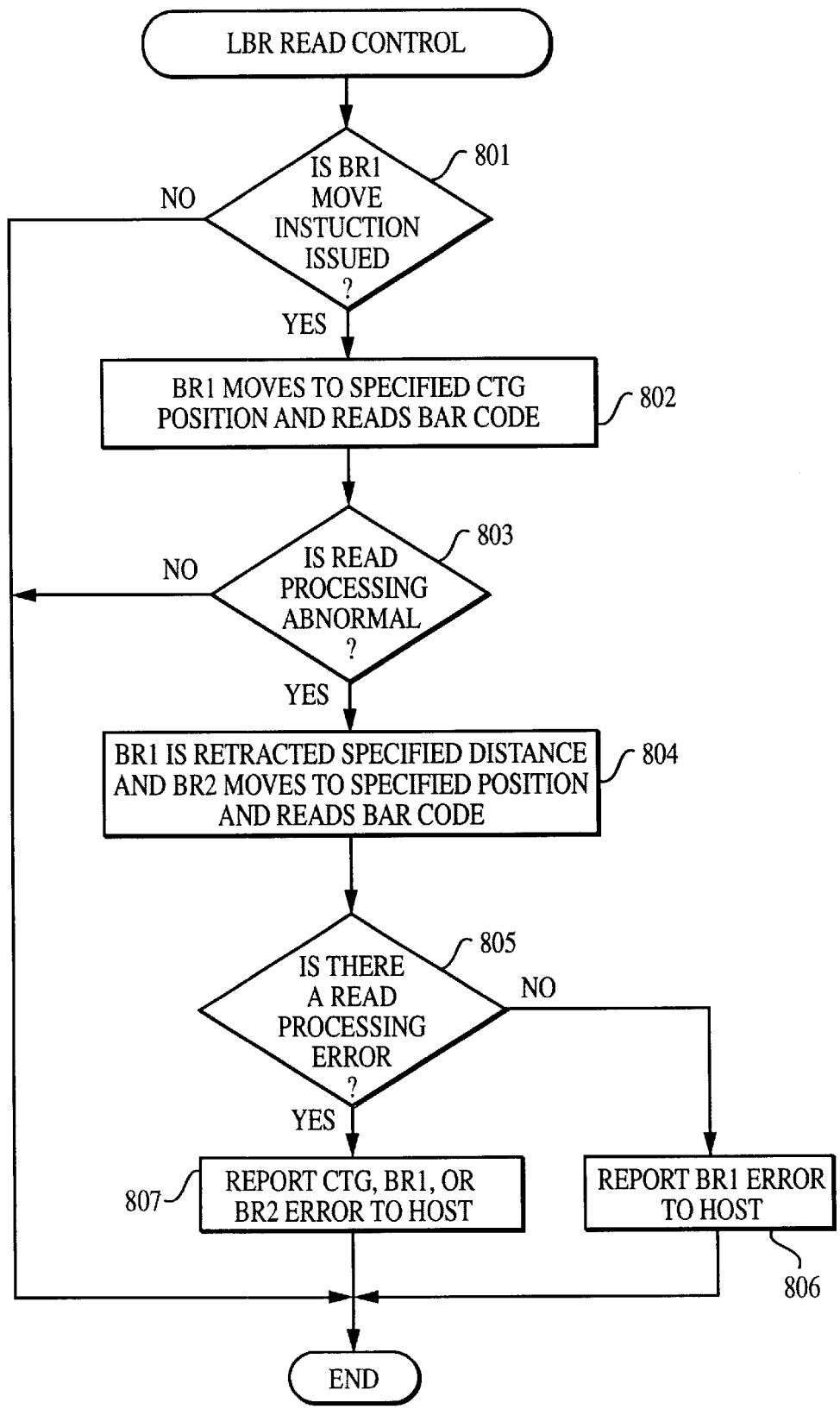
FIG. 26 is a flowchart which shows the procedure for LBR read control explained in FIG. 22.

FIG. 26 is a flowchart showing the read control procedure for the bar code readers 68A, 68B in FIG. 25. In the flowchart, the bar code reader 68A is abbreviated as BR1, the bar code reader 68B as BR2, and a cartridge 1 as CTG.

Step 801 is to check for a move instruction to the bar code reader 68A (BR1). If there is a no move instruction, the routine terminates. If there is a move instruction, the procedure advances to step 802 where the bar code reader 68A (BR1) moves to the position of a specified cartridge 1 to read the bar code label. Step 803 is to check whether the bar code reader 68A (BR1) read the bar code label without any read error. If no read error is detected, the routine terminates. If a read error is detected, the procedure advances to step 804.

In step 804, the bar code reader 68A (BR1) is retracted by a prescribed distance from the specified read position and the bar code reader 68B (BR2) is moved to the position of the specified cartridge to read its bar code label. Step 805 is to check whether the bar code reader 68B (BR2) read the bar code label without any read error. If no read error is detected, the procedure advances to step 806 where a fault of the bar code reader 68A (BR1) is reported to the host computer and the routine terminates. If a read error is detected when the bar code reader 68B (BR2) reads a bar code label in step 805, the procedure advances to step 807 where a fault of the cartridge or bar code reader 68A (BR1) or 68 (BR2) is reported to the host computer and the routine terminates.

In this example, if an operation error occurs in either bar code reader, the other bar code reader backs up the read processing. This enhances the reliability of the library device.

Figure 5:
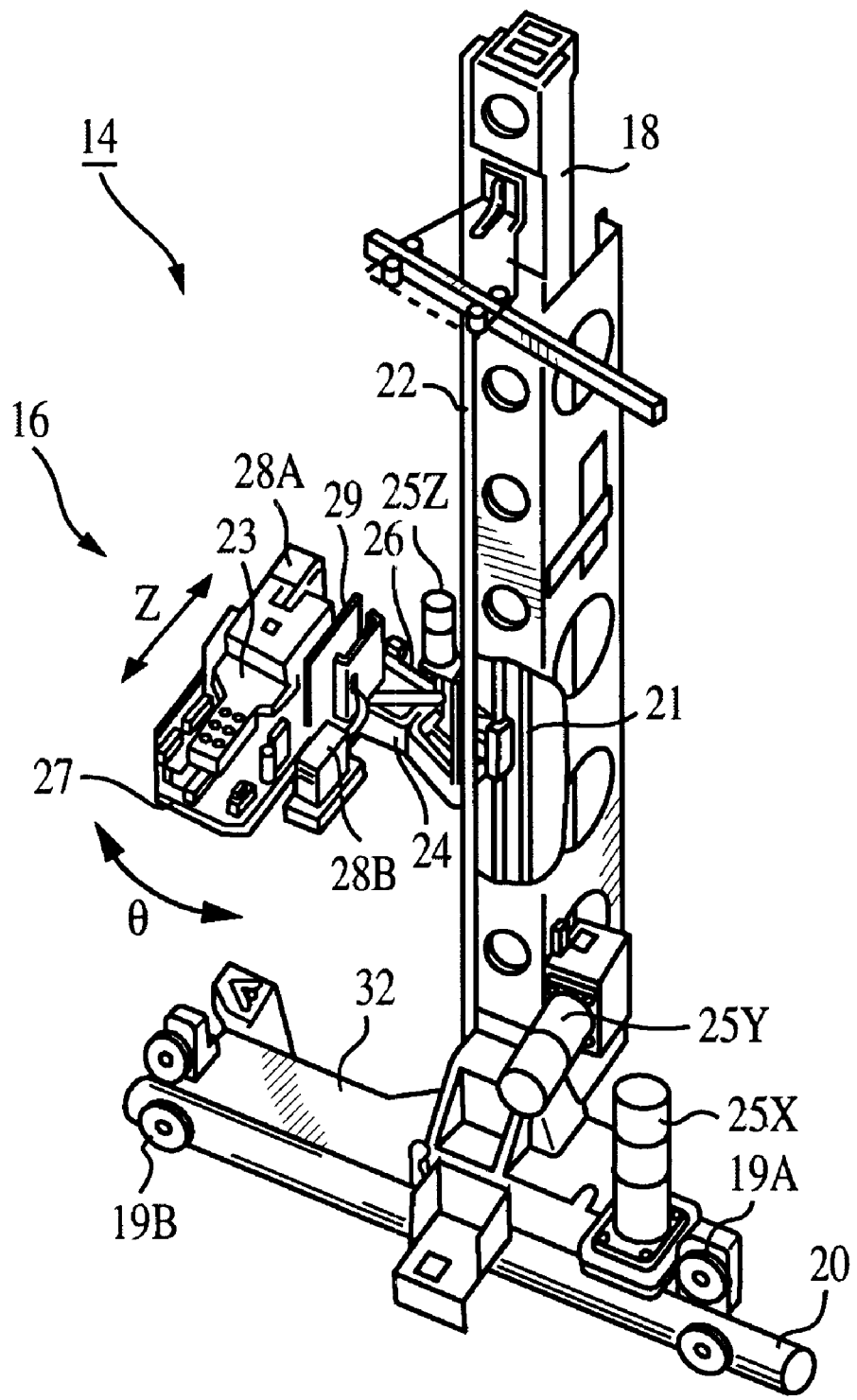
FIG. 5 is an isometric view of the structure of the accessor in the library device of FIG. 1.
Figure 6A:
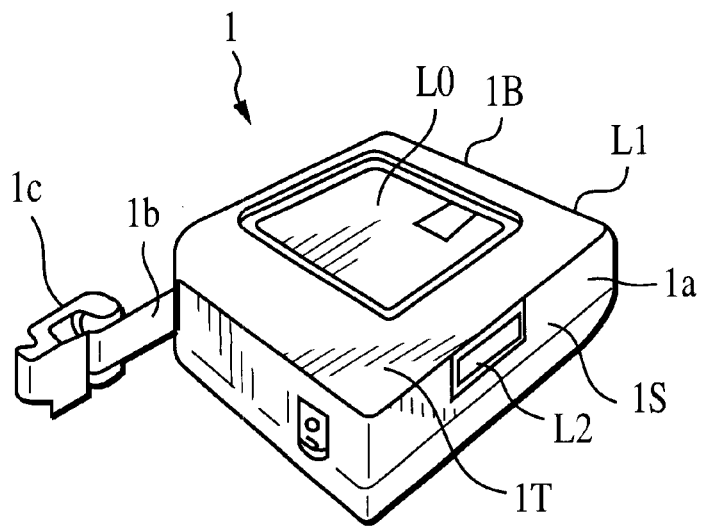
FIG. 6(a) is an isometric view showing the structure of a cartridge used in the library device of FIG. 1.
Figure 6B:
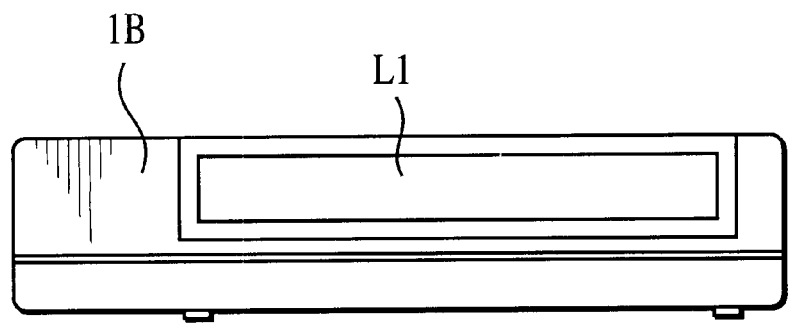
FIG. 6(b) is a back view of the cartridge showing the back bar code labeling position.
Figure 6C:
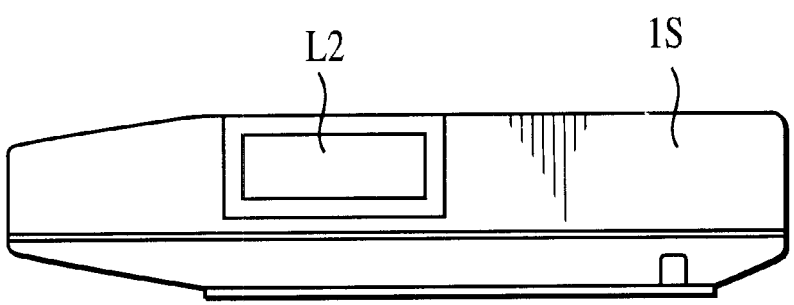
FIG. 6(c) is a side view of the cartridge showing the side bar code labeling position.
Figure 7A:
FIG. 7(a) shows a sample bar code label for the cartridge shown in FIG. 6(a)
Figure 7B:
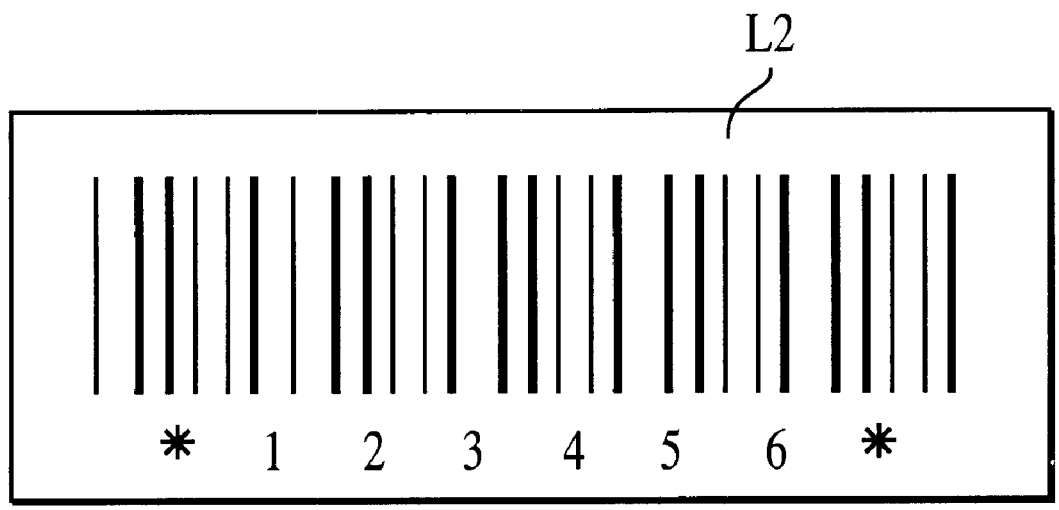
FIG. 7(b) shows a sample bar code label for the one shown in FIG. 6(b)
Figure 8:
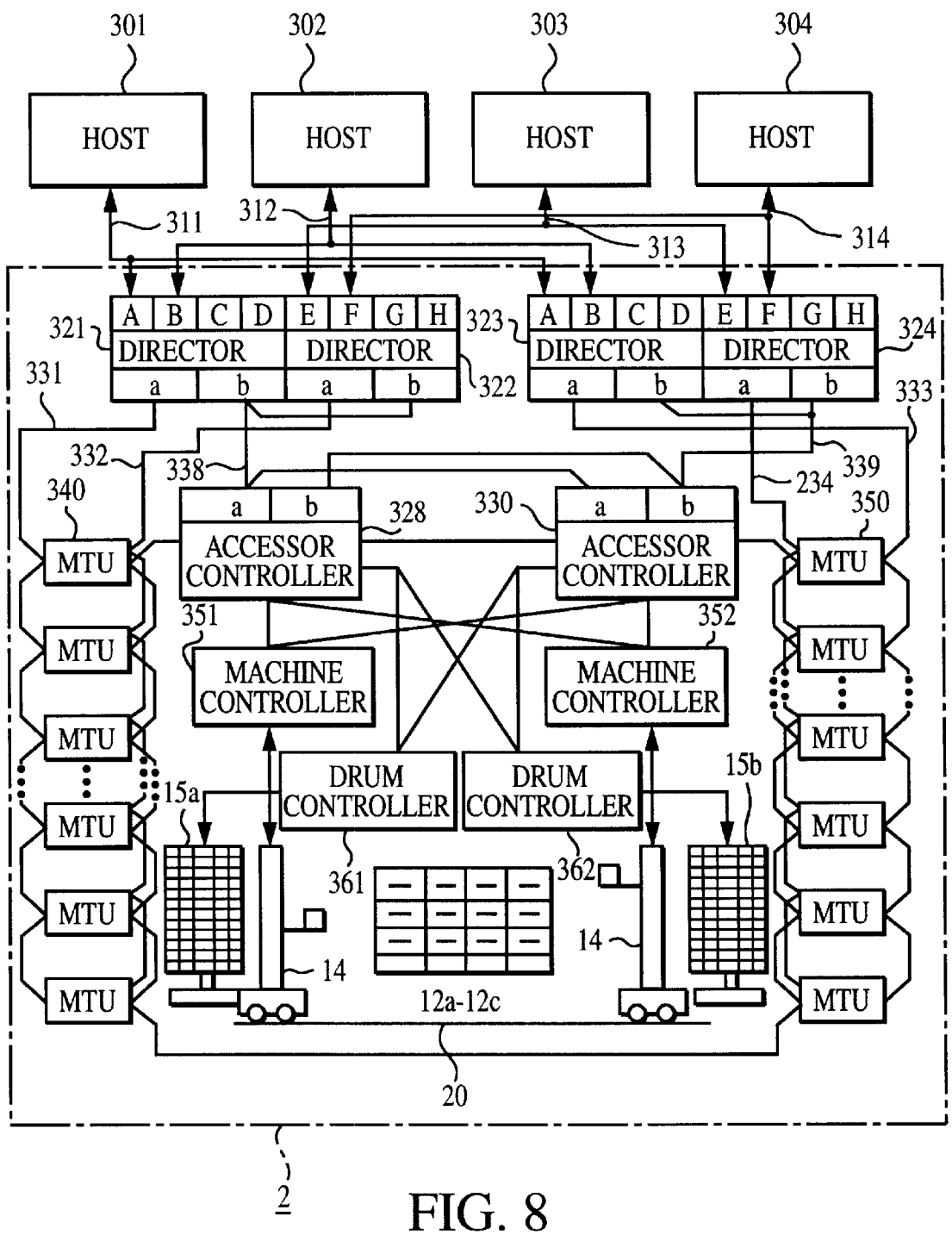
FIG. 8 is a block diagram showing the hardware configuration of the library device of FIG. 1.
Figure 9A:
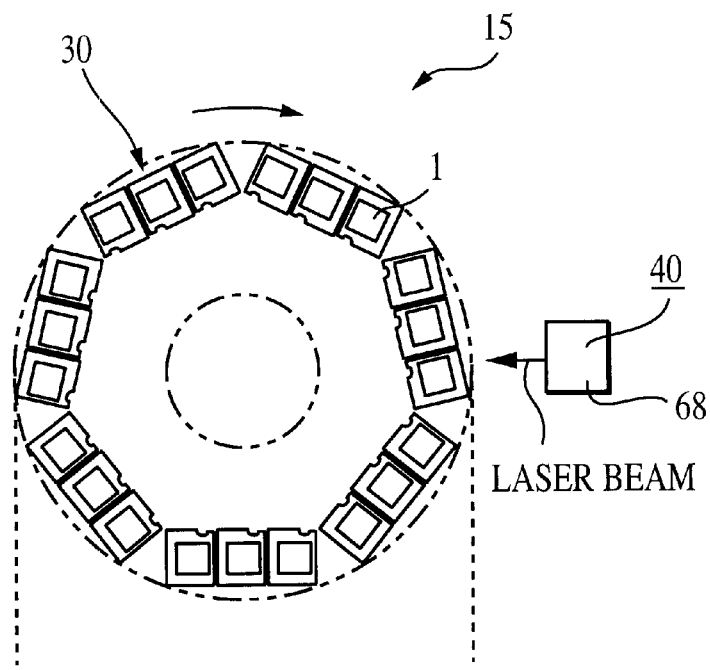
FIG. 9(a) is a plan view showing the positional relationship between a cell drum and LBR.
Figure 9B:
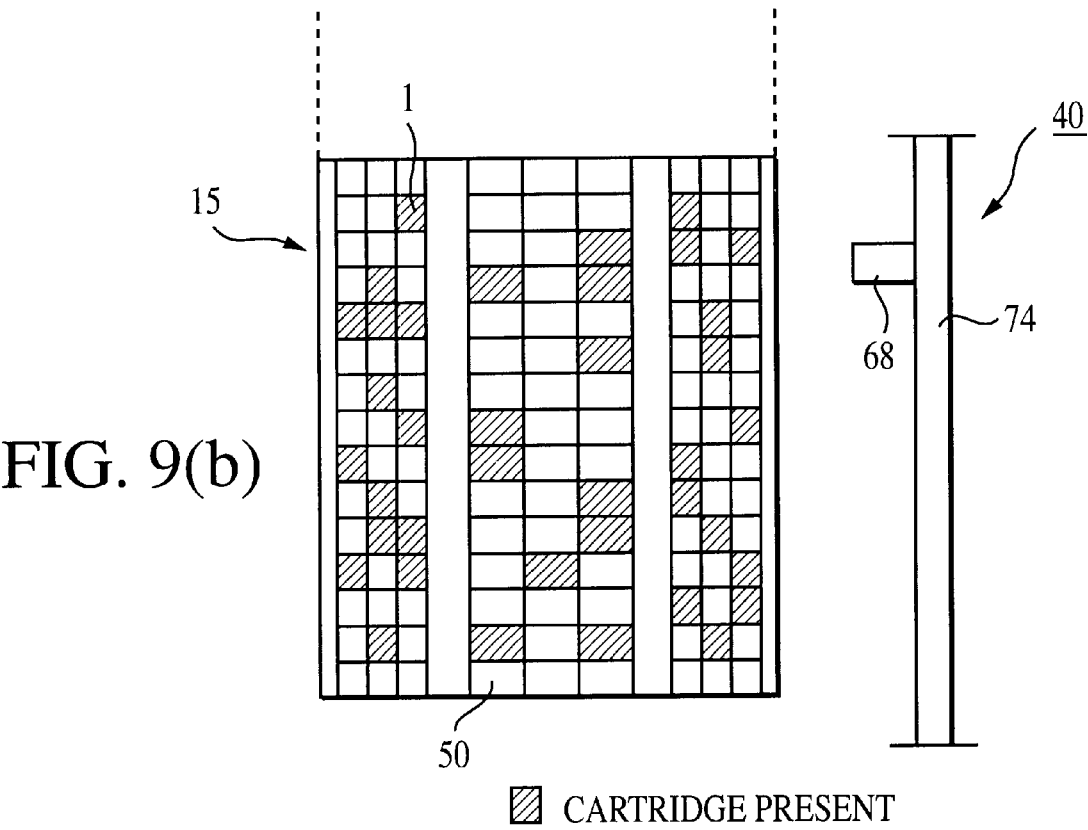
FIG. 9(b) is a side view showing the positional relationship between a cell drum and LBR.
Figure 10:
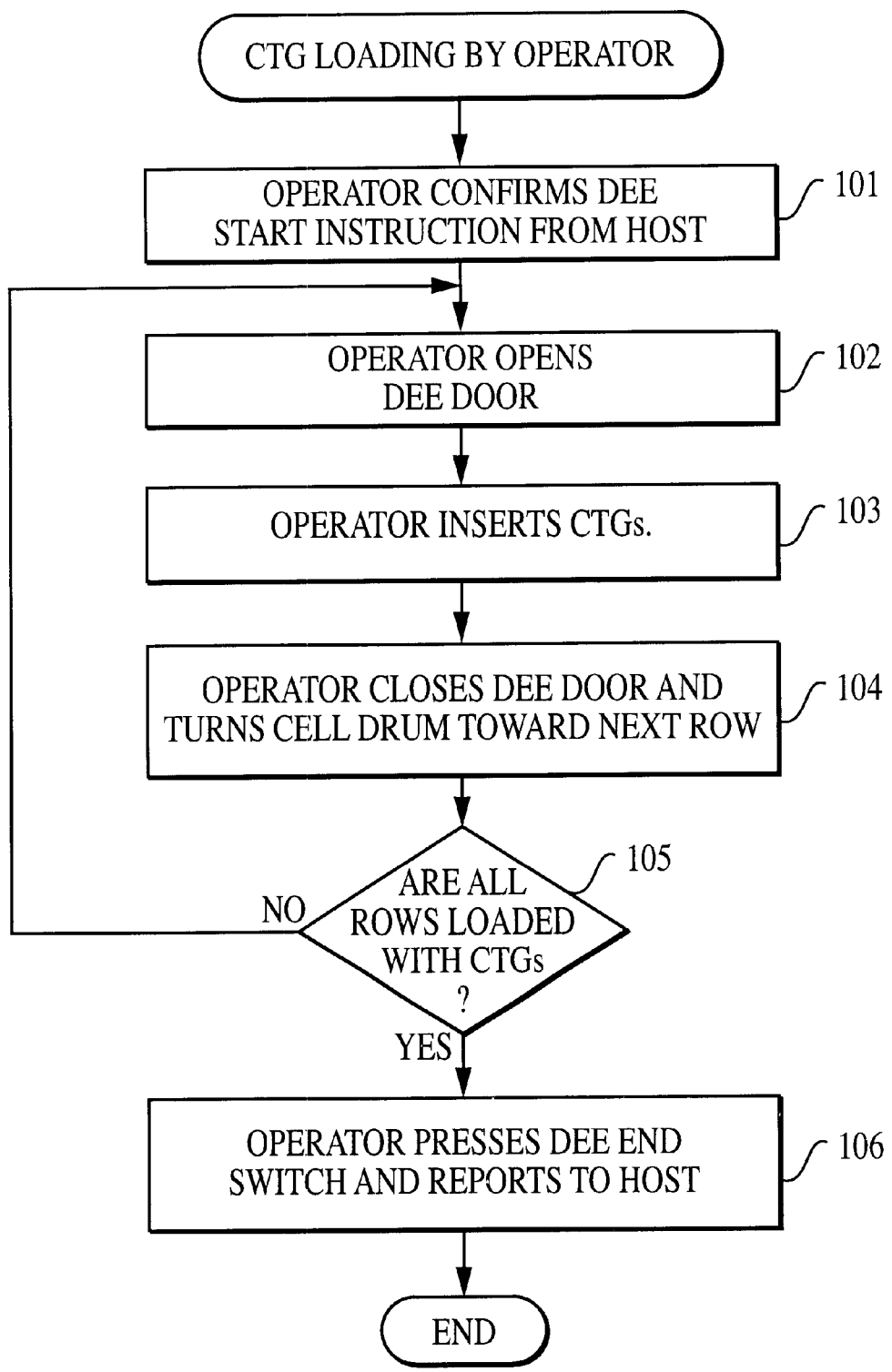
FIG. 10 is a flowchart showing the operator procedure for inserting cartridges into a cell drum.
Figure 27A:
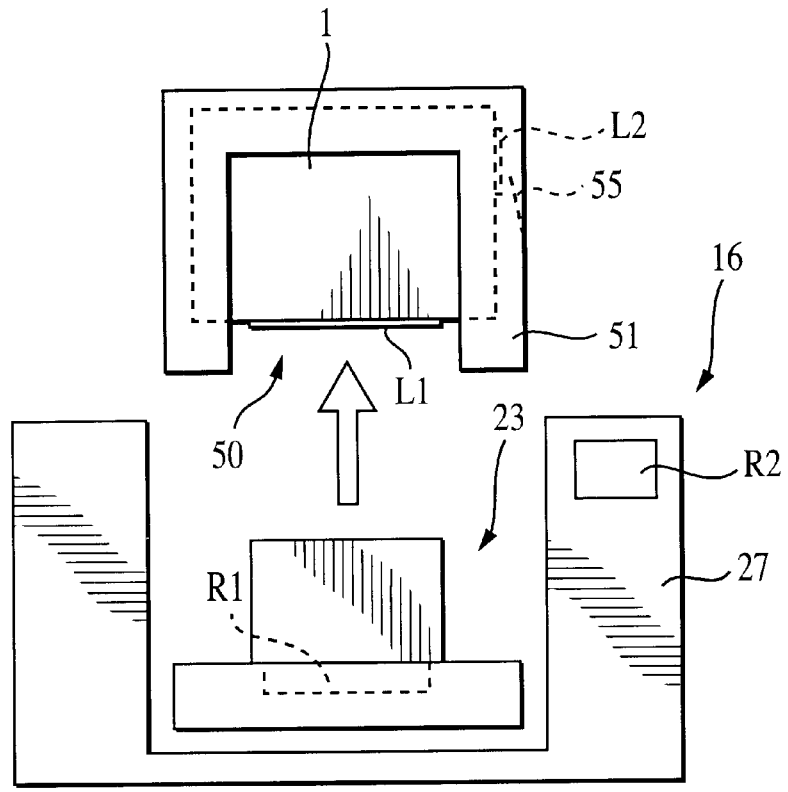
FIG. 27(a) shows the structure of an accessor with a cartridge label read function based on this invention.
Figure 27B:
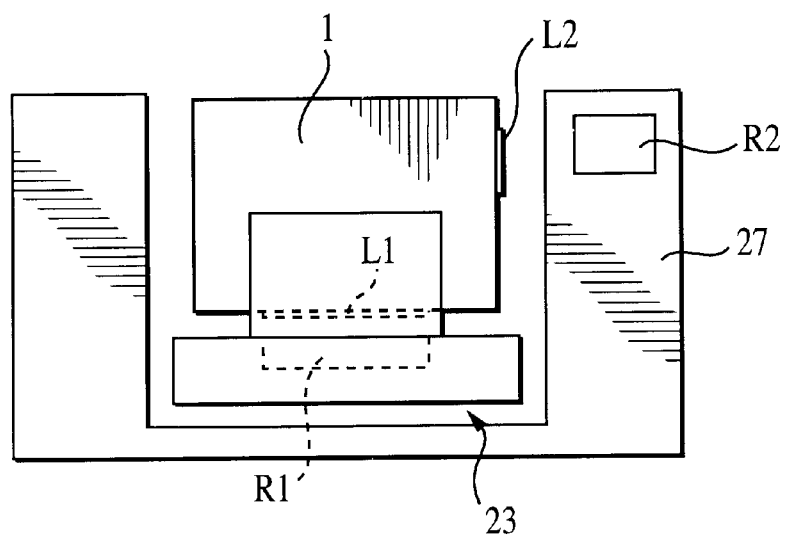
FIG. 27(b) shows cartridge label read processing by the accessor shown in FIG. 27(a)

FIG. 27(*a*) shows the structure of the hand assembly 16 of the accessor, having the label read function based on this invention. In this example, an operation error disables the local bar code reader 40 to read bar code labels on cartridges. Then the bar code reader mounted on the hand assembly 16 of the accessor 14 explained in FIG. 5 reads bar code labels at the accessor.

As FIG. 27(*a*) shows, a cartridge stored between the frame plates of each cell 50 has a bar code label L1 on its back and a bar code label L2 on its side. Therefore, the hand assembly 16 in this example has a bar code reader R1 at the base of the hand unit 23 to read the back bar code label L1 of a cartridge 1. To read the side bar code label L2 of a cartridge 1, the hand assembly 16 also has a bar code reader R2 at the mount base for moving the hand unit 23.

If the local bar code reader 40 fails to read bar code labels on a cartridge 1, the hand assembly 16 moves to the position of the cartridge, as shown in FIG. 27(*a*), and its hand unit 23 grips the cartridge, as shown in FIG. 27(*b*). In this state, the back bar code label L1 faces the bar code reader R1 and the side bar code label L2 faces the bar code reader R2. While gripping the cartridge 1, the bar code readers R1 and R2 read the back and side bar code labels L1 and L2.

In this example, even if the local bar code reader 40 fails to read bar code labels on a cartridge 1, the hand assembly 16 of the accessor 14 can read the bar code labels on the cartridge.

Figure 28A:
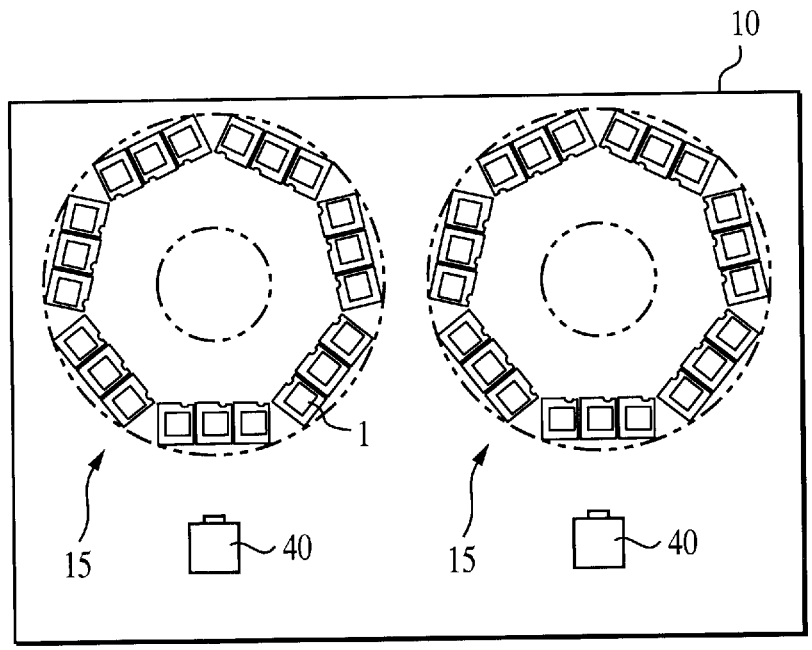
FIG. 28(a) shows the conventional LBR placement when two cell drums are installed in parallel.
Figure 28B:
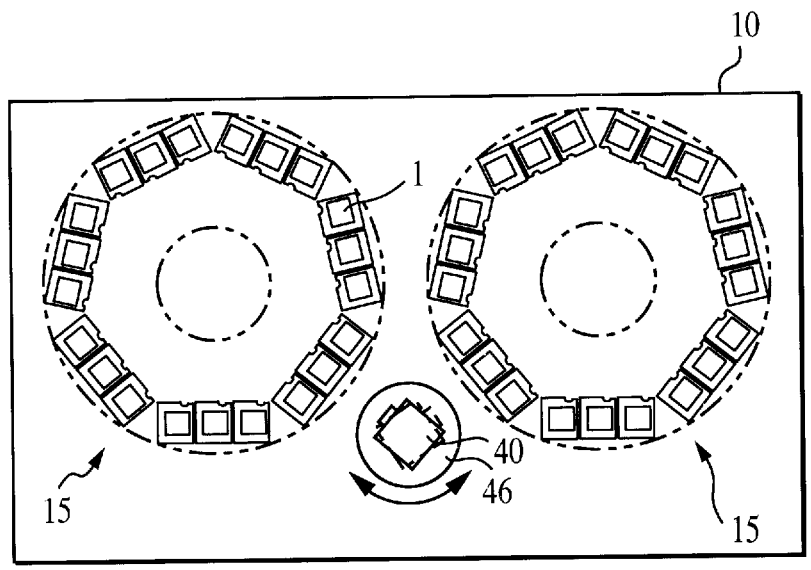
FIG. 28(b) shows the LBR placement based on this invention when two cell drums are installed in parallel.

FIG. 28(*a*) shows the conventional placement of local bar code reader 40 when two cell drums 15 are installed in the drum unit 10 in parallel. One local bar code reader 40 used to be assigned to each cell drum 15.

FIG. 28(*b*) shows the placement of local bar code reader 40 based on this invention when two cell drums 15 are installed in the drum unit 10 in parallel. Only one local bar code reader 40 is placed between the two cell drums 15. The local bar code reader has a rotation mechanism 46.

Since this rotation mechanism turns the local bar code reader 40 toward a cell drum to read bar code labels, only one local bar code reader is enough to read labels on cartridges 1 in two cell drums 15. Consequently, the number of local bar code readers 40 can be reduced to save on library device costs.

Figure 29:
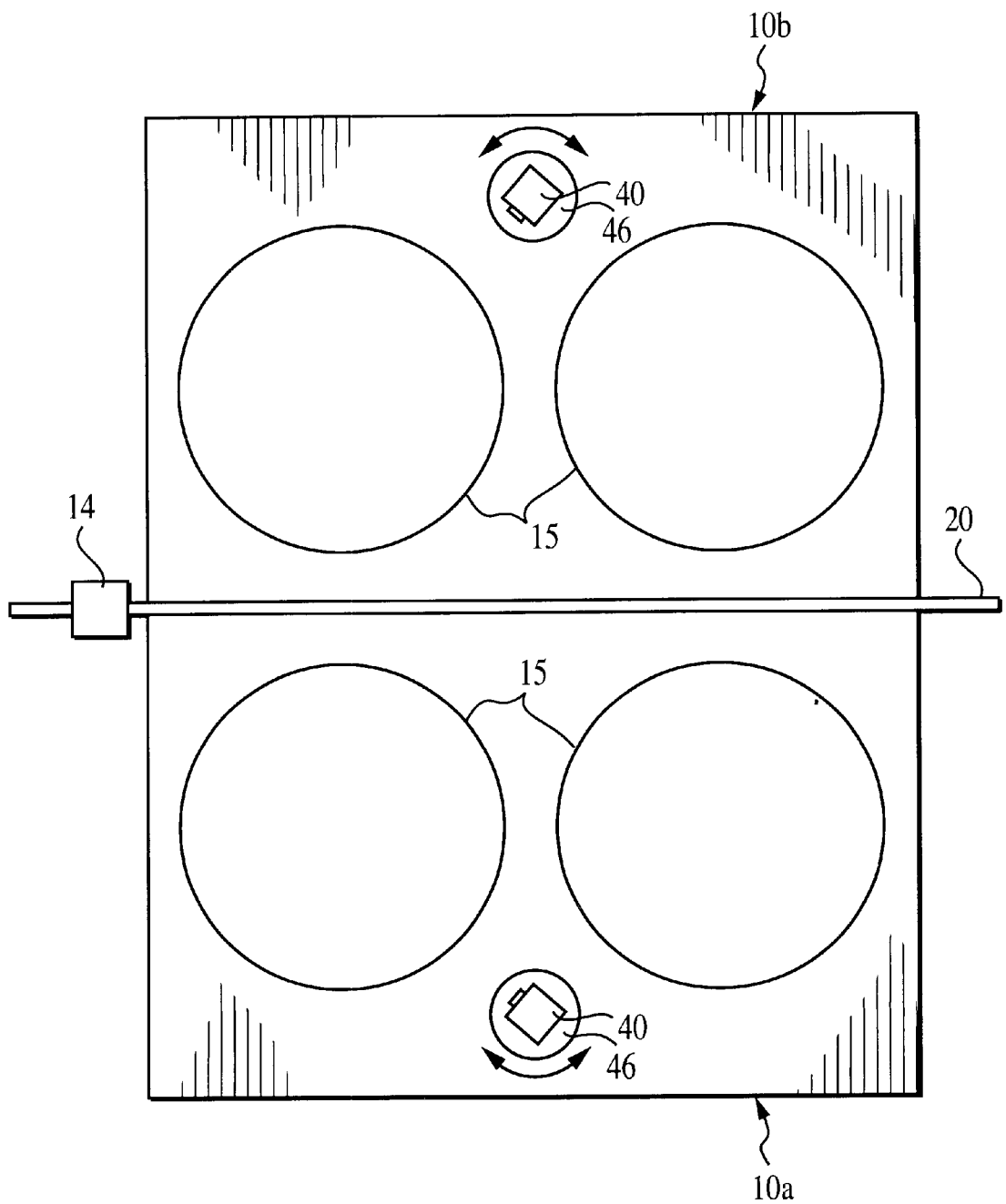
FIG. 29 is a plan view showing the placement of the cell drum and LBR based on FIG. 28(b)

FIG. 29 shows a library device of the configuration explained in FIG. 28(*b*). As this figure shows, if two drum units 10*a*, 10*b* are placed with the accessor-moving guide rail 20 in between, only two local bar code readers 40 are enough to cover four cell drums 15.

Figure 30:
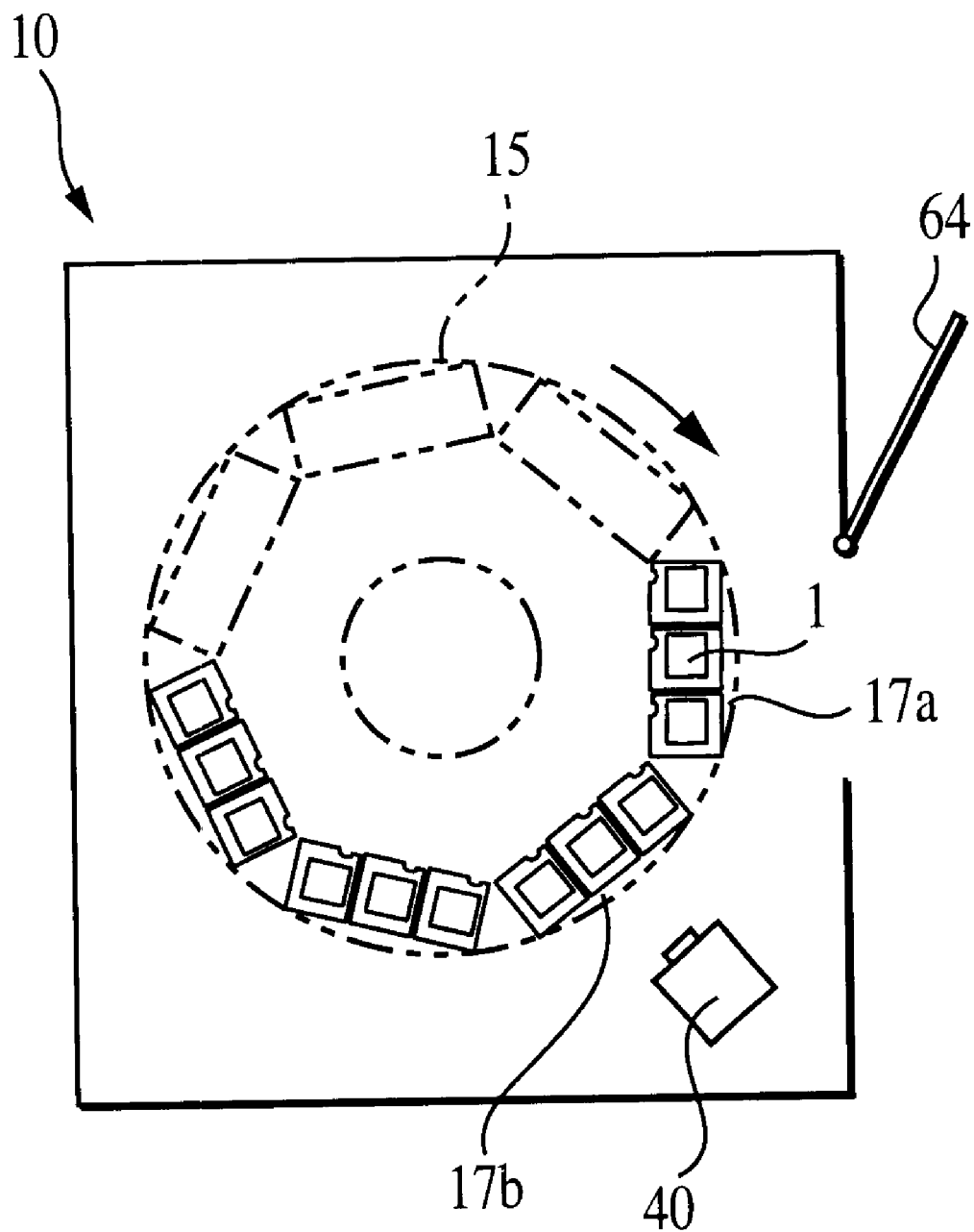
FIG. 30 is a plan view showing the placement of the LBR and the DEE door based on this invention.

FIG. 30 shows an example placement of local bar code reader 40 and DEE door 64 in the drum unit 10 based on this invention. In this example, the operator inserted cartridges into three rows of the cell drum through the DEE door 64. When the operator is inserting cartridges into the next three rows after the cell drum turns 15, the local bar code reader pre-reads the bar code labels on the cartridges in the first three rows.

In this example, when the cell segment 17*a* faces the DEE door 64, the local bar code reader 40 in the drum unit 10 faces the center of the adjacent cell segment 17*b* on the downstream side of the segment 17*b* when the cell drum 15 rotates. Consequently, when the operator is inserting cartridges 1 into the cell segment 17*a*, the local bar code reader 40 can pre-read bar codes on cartridges in the first three rows of the cell segment 17.

After cartridges 1 are inserted into the cell segment 17*a*, the operator closes the DEE door and issues a DEE end instruction to the host computer. If the host computer transfers a read instruction to the local bar code reader 40 after the DEE end instruction, the local bar code reader 40 only transfers data because the bar code labels on the cartridges 1 in the cell segment 17 have already been read. This reduces the amount of time the library uses to process data.

FIG. 31(*a*) is a timing chart showing the conventional DEE processing and cartridge read processing to transfer bar code data to the host computer. In the conventional system, the operator opens the DEE door 64 of the drum unit 10 in accordance with a START DEE command from the host computer to insert or eject cartridges 1 (DEE processing). After completing the DEE processing, the operator closes the DEE door 64 and sends a DEE END command to the host computer to terminate the DEE processing. When the DEE END command is received, the host computer inserts an RDBAR command to instruct the local bar code reader 40 to read bar code labels on the cartridges. The local bar code reader reads bar code labels on the cartridges in each row and transfers the read data to the host computer. Thus, it takes a long time to read the bar code labels on all of the cartridges 1 in a cell drum 15 and transfer all of the data to the host computer.

FIG. 31(*b*) is a timing chart showing the DEE processing and cartridge read processing to transfer bar code data to the host computer based on this invention. In the conventional system, the operator opens the DEE door 64 of the drum unit 10 in accordance with a START DEE command from the host computer to insert or eject cartridges 1 (DEE processing). After completing the DEE processing, the operator closes the DEE door 64 and sends a DEE END command to the host computer to terminate the DEE processing. The processing sequence so far is the same as before. In this example, however, the local bar code reader 40 reads bar code labels on all of the cartridges 1 in the cell drum 15. The read data may be stored in the memory of the controller 41, explained in FIG. 3. After the batch read processing, the local bar code reader 40 sends a DEE END command to the host computer to indicate the end of DEE processing.

When the DEE END command is received, the host computer issues a RDBAR BLLCK command to instruct the local bar code reader 40 to read bar code labels on all of the cartridges 1. In response to the RDBAR BLLCK command, the local bar code reader 40 can transfer to the host computer at a time all of the bar code label data of cartridges in a cell drum already read. This procedure reduces the time for transferring the bar code label data of the cartridges 1 in a cell drum 15 to the host computer.

Figure 31A:
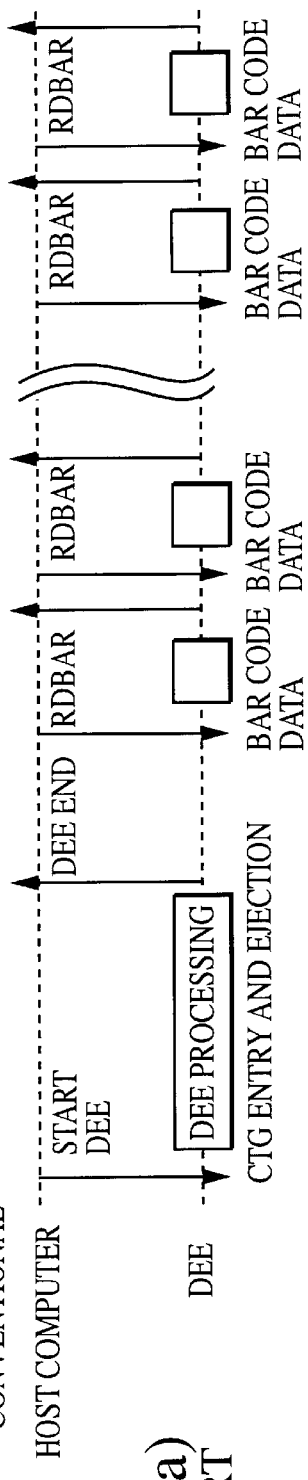
FIG. 31(a) is a timing chart showing the conventional DEE processing and cartridge read processing to transfer bar code data to the host computer.
Figure 31B:
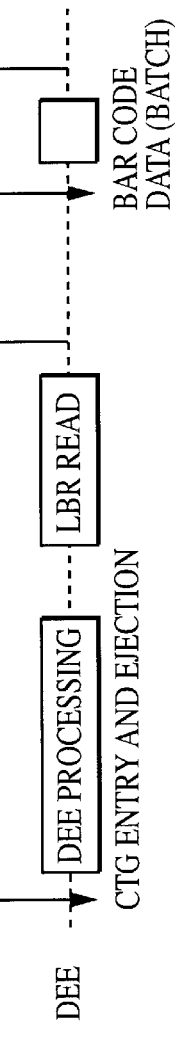
FIG. 31(b) is a timing chart showing the conventional DEE processing and cartridge read processing to transfer bar code data to the host computer under the configuration shown in FIG. 30.

The configuration shown in FIG. 30 further reduces the time for the batch transfer of bar code label data to the host computer by the procedure shown in FIG. 31(b).

Figure 32:
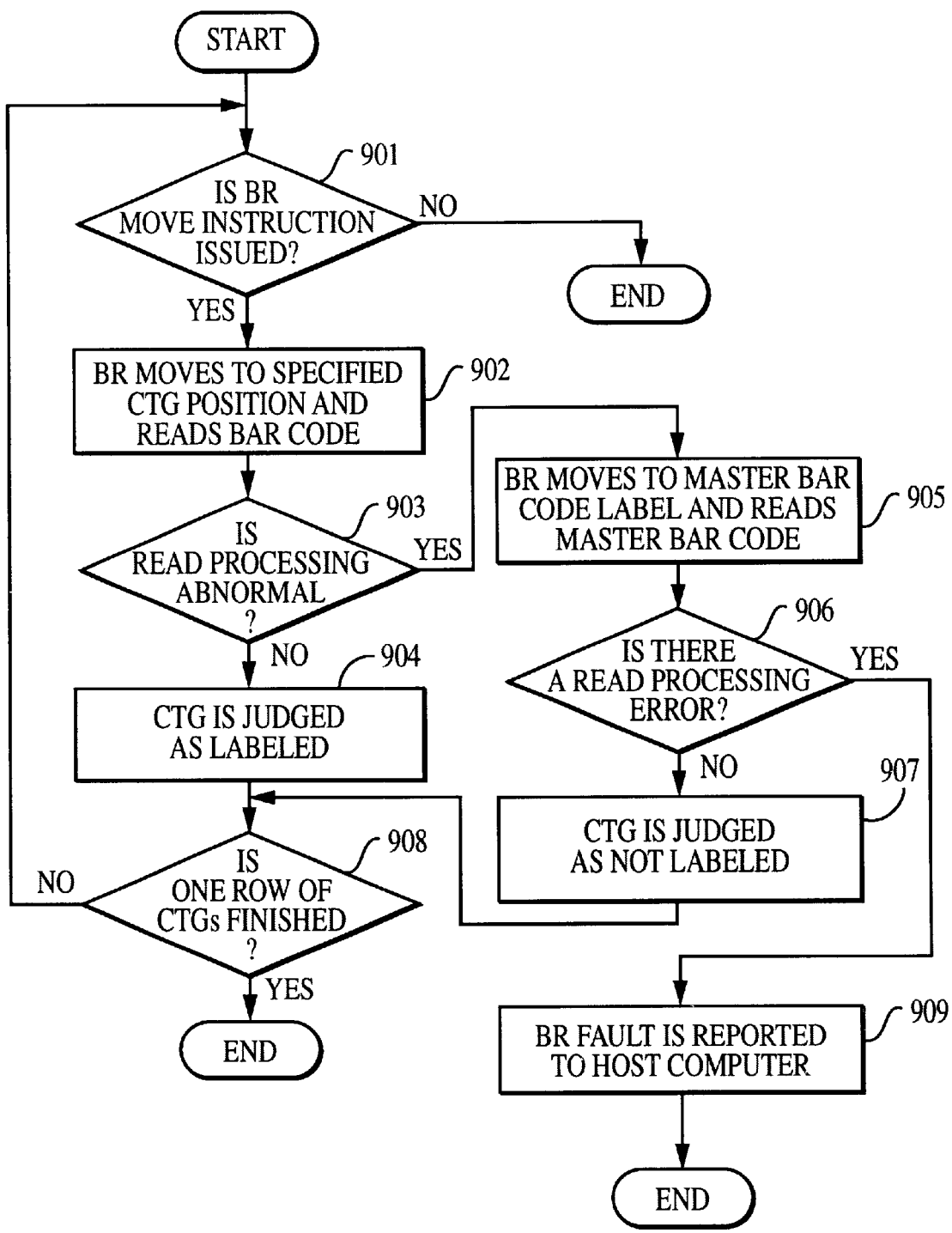
FIG. 32 is a flowchart which shows the conventional DEE processing and cartridge read processing to transfer bar code data to the host computer.

In the conventional DEE processing and cartridge read processing to transfer bar code data to the host computer shown in FIG. 31(a), the presence of labels on a cartridge 1 used to be checked in accordance with the flowchart shown in FIG. 32. In this flowchart, a bar code reader 68 is abbreviated as BR and a cartridge 1 as CTG.

Step 901 is to check for a move instruction to the bar code reader. If there is a no move instruction, this routine terminates. If there is a move instruction, the procedure advances to step 902, where the bar code reader moves to the position of a specified cartridge 1 to read the bar code label. Step 903 is to check whether the bar code reader reads the bar code label without any read error. If no read error is detected, this routine terminates. If a read error is detected, the procedure advances to step 904, where the presence of a label is checked. In the next step 908, the system checks whether the bar code reader has finished reading a row of cartridges. If one row has not been completed yet, the same processing is repeated from step 901 and this routine terminates after one row is completed.

If a read error was detected in step 903, the procedure advances to step 905 where the bar code reader 68 moves to the master bar code label and reads the master bar code. Step 906 is to check whether the master bar code could be read without any read error. If no read error is detected, the procedure returns to step 908 because the cartridge is regarded as having no bar code label. If a read error is detected in step 906, the procedure advances to step 909 where a fault of the bar code reader 68 is reported to the host computer.

Each time a bar code label read error occurs in the conventional procedure, the master bar code is read and the no-label status or a fault of the local bar code reader 40 is reported. Therefore, the local bar code reader used to take a long period of time to process a label read error on a cartridge 1.

Figure 33:
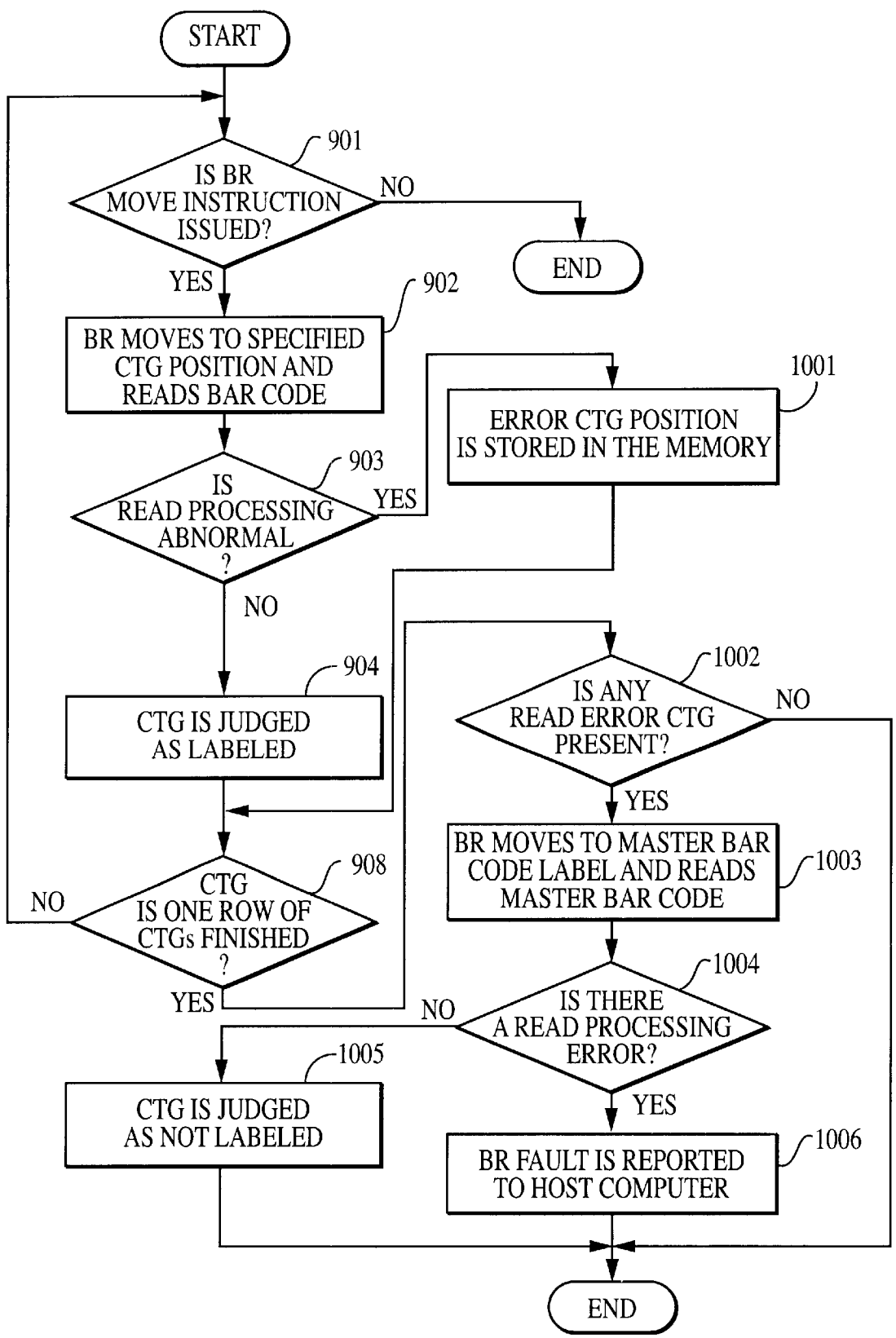
FIG. 33 is a flowchart of the conventional DEE processing and cartridge read processing to transfer bar code data to the host computer based on this invention.

FIG. 33 is a flowchart showing the procedure for identifying labels on cartridges. In the flowchart, the same control steps as those in the flowchart of FIG. 32 are numbered in the same manner and a bar code reader 68 is abbreviated as BR and a cartridge as CTG.

Step 901 is to check for a move instruction to the bar code reader. If there is no move instruction, this routine terminates. If there is a move instruction, the procedure advances to step 902, where the bar code reader moves to the position of a specified cartridge 1 to read the bar code label. Step 903 is to check whether the bar code reader read the bar code label without any read error. If no read error is detected, this routine terminates. If a read error is detected, the procedure advances to step 904 where the presence of a label is checked. In the next step 908, the system checks whether the bar code reader has finished reading a row of cartridges. If one row has not been completed yet, the same processing is repeated from step 901 and this routine terminates after one row is completed.

If a read error was detected in step 903, the procedure advances to step 1001 where the position of the read error cartridge is stored in the memory and the procedure returns to step 908.

After one row of cartridges is read, the procedure advances to step 1002 where the data is checked for an error cartridge 1. If no error cartridge is detected, this routine terminates. If an error cartridge is detected, the procedure advances to step 1003 where the bar code reader moves to the master bar code label 67 and reads the master bar code. Step 1004 is to check whether the master bar code could be read without any read error. If no read error is detected, the procedure returns to step 1005. If a read error is detected, the procedure advances to step 1006. In step 1005, this routine terminates because the cartridge is regarded as having no bar code label. In step 1006, a fault of the bar code reader is reported to the host computer and this routine terminates.

If a cartridge label read error occurs during the example procedures of this invention, the master bar code is read after one row of cartridges is processed. This reduces the processing time for a cartridge label read error in the local bar code reader 40.

The many advantages of the invention are now apparent. The library device can accurately read bar code labels on cartridges, even when the local bar code reader is faulty or fails to read a bar code label. The bar code read time required after the operator finishes DEE work is reduced, as well as the time for reporting bar code data to the host computer. The time for checking a cartridge for a label is also reduced.

While the principles of the invention have been described above in connection with specific apparatus and application, it is to be understood that this description is made only by way of example and not as a limitation on the scope of the invention.

What is claimed is

1. A large-capacity storage device connected to a computing system with cartridges as storage media, comprising:
   a data recording and regenerating device for writing data into, and reading it from cartridges,
   a cartridge entry-exit device for inserting and ejecting cartridges,
   a cell drum having a plurality of cells for storing cartridges,
   a media transporting device for transporting cartridges between the cells and said data recording and regenerating device, and
   a label reading device for reading labels on cartridges,
     wherein a laser guidance means beside the cartridge in each cell of said cell drum guides laser beams from said label reading device to the side of each cartridge for reading labels by the device, and
     wherein said label reading device includes:
       means for comparing data read from a label on the back of a cartridge with that read from a side label of the same cartridge, and
       means for outputting a cartridge error signal if the data does not match.

2. The storage device of claim 1 wherein said laser guidance means comprises a mirror.

3. The storage device of claim 1 wherein said laser guidance means comprises a prism.

4. The storage device of claim 1, wherein said label reading device has a mechanism for reading labels on the sides of cartridges, and for reading labels on the back of the cartridges.

5. The storage device of claim 1, wherein said cell drum rotates so that said label reading device can read labels on the sides of cartridges and on the backs of cartridges.

6. The storage device of claim 1, wherein said label reading device includes means for determining whether the label on the back of a cartridge could be read normally, and means for instructing data read from the side label of the same cartridge if the device failed to read the back label.

7. The storage device of claim 6 further comprising a master bar code label, having a master bar code, wherein said label reading device includes means for determining whether the label on the back of a cartridge could be read normally, means for instructing a read of the data from the master bar code label on said label reading device if the device failed to read the back label, means for determining whether the master bar code could be read normally, and means for instructing a read of the data from the side label of the same cartridge only when the device succeeded in reading the master bar code.

8. The storage device of claim 1, wherein two units of said drum cell are installed in parallel, and said label reading device is rotatable so that it can read labels in each of the two cell drums.

9. The storage device of claim 1, wherein said label reading device is installed at a downstream rotation side of the said cell drum against a cartridge entry-exit door for the cell drum, wherein said label reading device can read a cartridge after the cartridge is inserted through said door and said cell drum rotates to another cartridge entry position.

10. A large-capacity storage device connected to a computing system with cartridges as storage media, comprising:

a data recording and regenerating device for writing data into, and reading it from cartridges, a cartridge entry-exit device for inserting and ejecting cartridges, a cell drum having a plurality of cells for storing cartridges, a media transporting device for transporting cartridges between the cells and said data recording and regenerating device, and a label reading device for reading labels on cartridges,
wherein a laser guidance means beside the cartridge in each cell of said cell drum guides laser beams from said label reading device to the side of each cartridge for reading labels by the device, wherein
said label reading device has means for determining whether a label on the back of a cartridge could be read normally, and
means for instructing data read from a side label of the same cartridge if the device failed to read the back label.

11. The storage device of claim 10 further comprising a master bar code label having a master bar code, wherein said label reading device includes means for determining whether the label on the back of a cartridge could be read normally, means for instructing a read of the data from the master bar code label on said label reading device if the device failed to read the back label, means for determining whether the master bar code could be read normally, and means for instructing a read of the data from the side label of the same cartridge only when the device succeeded in reading the master bar code.

12. A large-capacity storage device connected to a computing system with cartridges as storage media, comprising:

a data recording and regenerating device for writing data into, and reading it from cartridges, a cartridge entry-exit device for inserting and ejecting cartridges, a cell drum having a plurality of cells for storing cartridges, a media transporting device for transporting cartridges between the cells and said data recording and regenerating device, and a label reading device for reading labels on cartridges,
wherein a laser guidance means beside the cartridge in each cell of said cell drum guides laser beams from said label reading device to the side of each cartridge for reading labels by the device, wherein
the media transporting device includes a gripping mechanism for gripping a cartridge, the library device further comprising
a mechanism surrounding frame equipped with a first bar code reader for reading data from a back label on the gripped cartridge and a second bar code reader at a frame position opposing the side of a cartridge in a cell gripped by said gripping mechanism, so that labels on both the back and side of a cartridge may be read.

13. The storage device of claim 12, wherein said label reading device has means for instructing the media transporting device to recheck a cartridge determined as non-labeled by the label reading device for a label, and said media transporting device grips said cartridge in accordance with a recheck signal and checks the cartridge again for a label with said two bar code readers.

14. A large-capacity storage device connected to a computing system with cartridges as storage media, comprising:

a data recording and regenerating device for writing data into, and reading it from cartridges, a cartridge entry-exit device for inserting and ejecting cartridges, a cell drum having a plurality of cells for storing cartridges, a media transporting device for transporting cartridges between the cell plates and said data recording and regenerating device, and a label reading device at the cell drum for reading labels on cartridges,
wherein said label reading device rotates to at least one predetermined position so that a label can be read by said label reading device, and
wherein further said label reading device can read more than one label on the cartridges, said label reading device further including,
means for comparing data read from a label on the back of a cartridge with that read from a side label of the same cartridge, and
means for outputting a cartridge error signal if the data does not match.

15. A large-capacity storage device connected to a computing system with cartridges as storage media, comprising:

a data recording and regenerating device for writing data into, and reading it from cartridges, a cartridge entry-exit device for inserting and ejecting cartridges, a cell drum having a plurality of cells for storing cartridges, a media transporting device for transporting cartridges between the cell plates and said data recording and regenerating device, a label reading device at the cell drum for reading labels on cartridges, a master bar code label having a master bar code secured, and a label reading device for reading labels on cartridges, said label reading device also reading said master bar code label, wherein said master bar code label is read when a label on a cartridge is unable to be read, to determine whether the label reading device is faulty.

* * * * *